United States Patent [19]
Christenson

[11] Patent Number: 5,562,390
[45] Date of Patent: Oct. 8, 1996

[54] DETACHABLE TRUCK BODY AND HANDLING MECHANISM

[75] Inventor: Ronald E. Christenson, Parsons, Tenn.

[73] Assignee: McNeilus Truck and Manufacturing, Inc., Dodge Center, Minn.

[21] Appl. No.: 398,954

[22] Filed: Mar. 2, 1995

Related U.S. Application Data

[63] Continuation-in-part of Ser. No. 377,146, Jan. 24, 1995.

[51] Int. Cl.$^6$ ................................................ B60P 1/64
[52] U.S. Cl. .......................... 414/477; 414/408; 414/495; 414/498
[58] Field of Search ......................... 414/477–480, 414/495, 498, 406–409, 525.1, 525.2; 410/77, 80, 84; 280/DIG. 8; 298/12, 17.5, 22 P, 22 B, 22 D

[56] References Cited

U.S. PATENT DOCUMENTS

| | | | |
|---|---|---|---|
| 2,189,052 | 2/1940 | Anthony | 298/22 B X |
| 3,202,305 | 8/1965 | Dempster et al. | 414/498 X |
| 3,262,678 | 7/1966 | Hand | 414/498 X |
| 3,370,525 | 2/1968 | Bowles | 100/48 |
| 3,414,147 | 12/1968 | Schroering | 414/421 |
| 3,507,410 | 5/1970 | Liberman et al. | 214/41 |
| 3,520,433 | 7/1970 | Blackburn | 414/498 |
| 3,724,697 | 4/1973 | Arvidsson | 414/498 X |
| 3,966,096 | 6/1976 | Worthington | 222/389 |
| 3,988,035 | 10/1976 | Corompt | 414/498 X |
| 4,068,769 | 1/1978 | Sweet et al. | 414/519 |
| 4,085,857 | 4/1978 | Smith | 414/408 |
| 4,102,261 | 7/1978 | Liberman et al. | 100/24 |
| 4,102,262 | 8/1978 | Liberman et al. | 100/53 |
| 4,116,121 | 9/1978 | Liberman et al. | 100/39 |
| 4,125,196 | 11/1978 | Liberman et al. | 414/417 X |
| 4,165,007 | 8/1979 | Brown | 414/494 |
| 4,229,019 | 10/1980 | Kohley | 414/495 X |
| 4,290,726 | 9/1981 | Sutela et al. | 414/421 |
| 4,456,414 | 6/1984 | Williams | 410/80 |
| 4,527,939 | 7/1985 | Suarez | 414/382 |
| 4,755,098 | 7/1988 | Wulf et al. | 414/546 |
| 4,844,672 | 7/1989 | Yurgevich | 410/54 |
| 4,954,040 | 9/1990 | Smith et al. | 414/513 |
| 4,992,014 | 2/1991 | Bock | 410/52 |
| 5,000,645 | 3/1991 | Polojarvi | 414/495 X |
| 5,044,861 | 9/1991 | Kirchoff et al. | 414/498 X |
| 5,064,332 | 11/1991 | Edelhoff et al. | 414/408 |
| 5,067,740 | 11/1991 | Christenson | 280/407 |
| 5,072,845 | 12/1991 | Grogan | 410/54 X |
| 5,078,560 | 1/1992 | Patrick et al. | 410/68 |
| 5,085,554 | 2/1992 | Kirchhoff et al. | 414/346 |
| 5,106,247 | 4/1992 | Hove et al. | 410/73 |
| 5,108,247 | 4/1992 | Vlaanderen | 414/421 |
| 5,143,496 | 9/1992 | Smith et al. | 410/68 |
| 5,246,329 | 9/1993 | Farrell | 414/478 |
| 5,328,320 | 7/1994 | Farrow et al. | 414/498 X |

FOREIGN PATENT DOCUMENTS

| | | | |
|---|---|---|---|
| 37967 | 12/1930 | France | 414/477 |
| 1543515 | 10/1968 | France | 414/498 |
| 2397303 | 3/1979 | France | 414/498 |
| 2588221 | 4/1987 | France | 414/498 |
| 2648768 | 12/1990 | France | 414/477 |
| 3708066 | 9/1988 | Germany | 414/477 |
| 121940 | 5/1991 | Japan | 414/498 |
| 1190481 | 5/1970 | United Kingdom | 414/498 |
| 2226805 | 7/1990 | United Kingdom | 414/498 |
| 9421540 | 9/1994 | WIPO . | |

*Primary Examiner*—David A. Bucci
*Attorney, Agent, or Firm*—Haugen and Nikolai, P.A.

[57] ABSTRACT

A container handling apparatus for receiving, engaging and releasing exchangeable chassis or sub-frame mounted containers, which may be truck bodies, or the like, capable of readily locking and unlocking a truck body or sub-frame to a supporting chassis is disclosed that is self-contained on the chassis. A truck body or container which may be self-supporting is also disclosed.

11 Claims, 19 Drawing Sheets

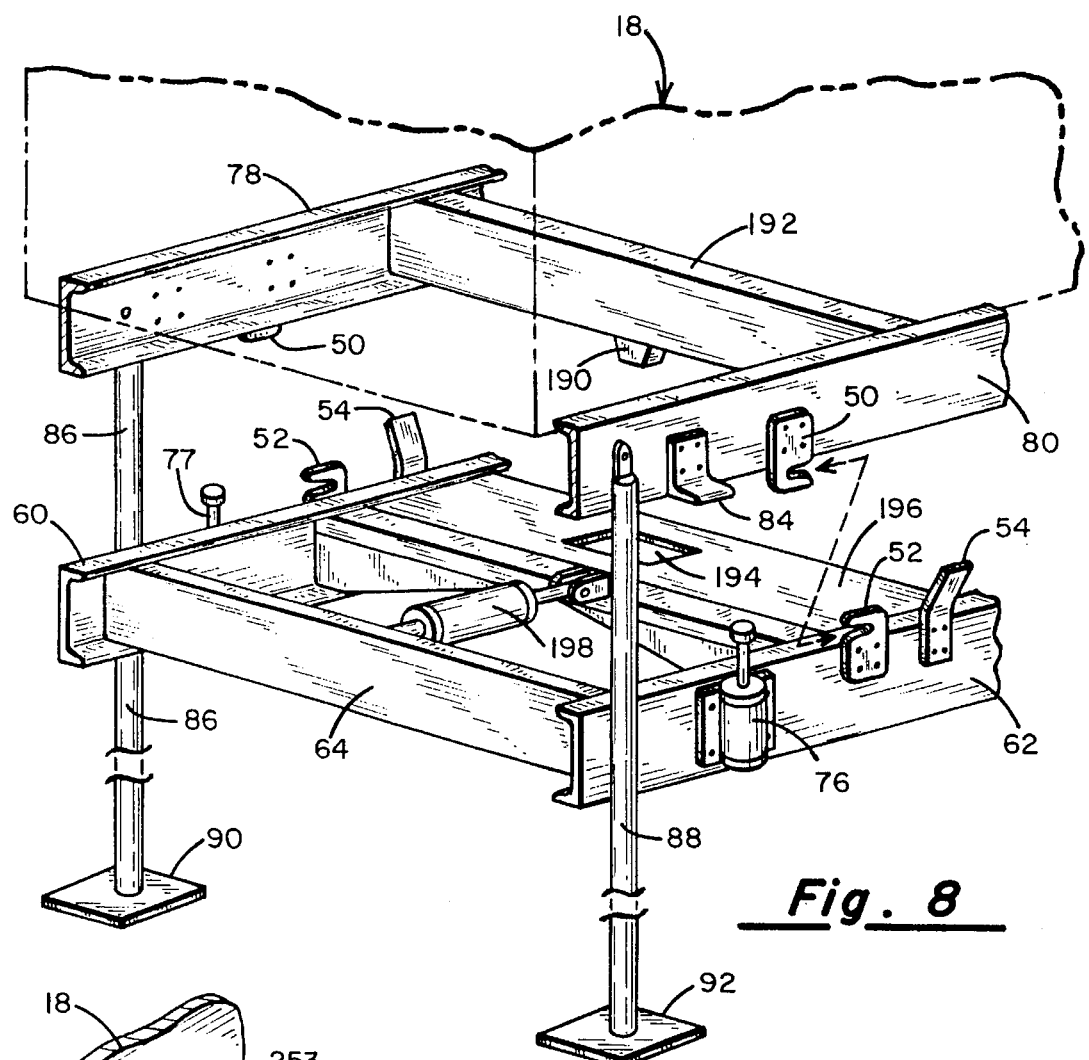
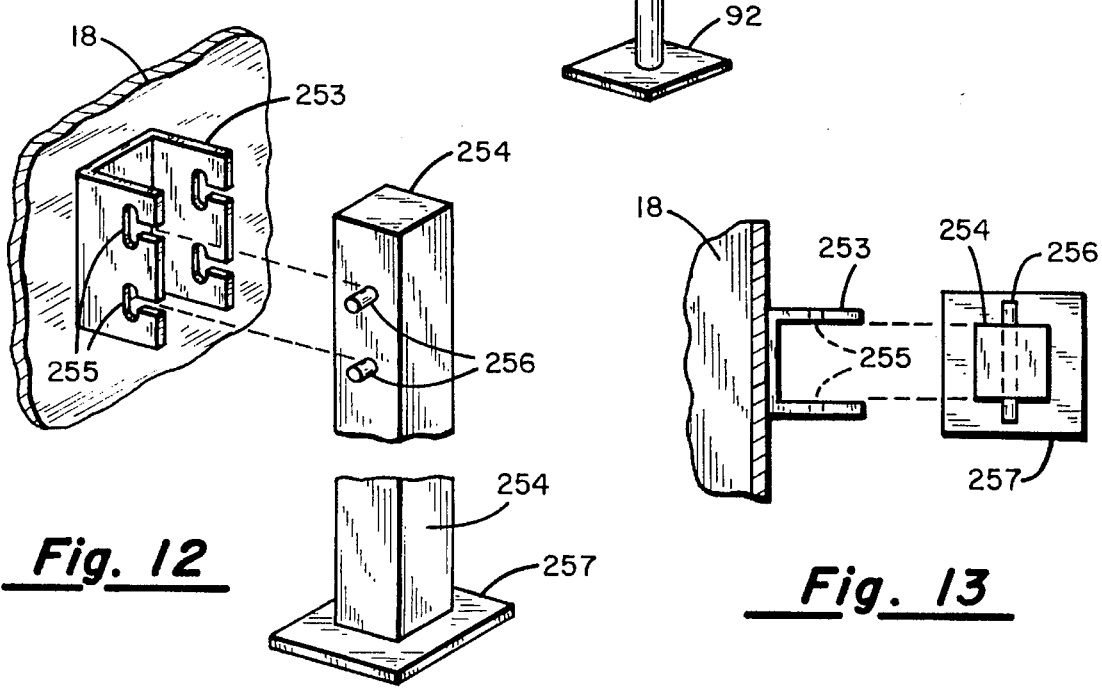
Fig. 8
Fig. 12
Fig. 13

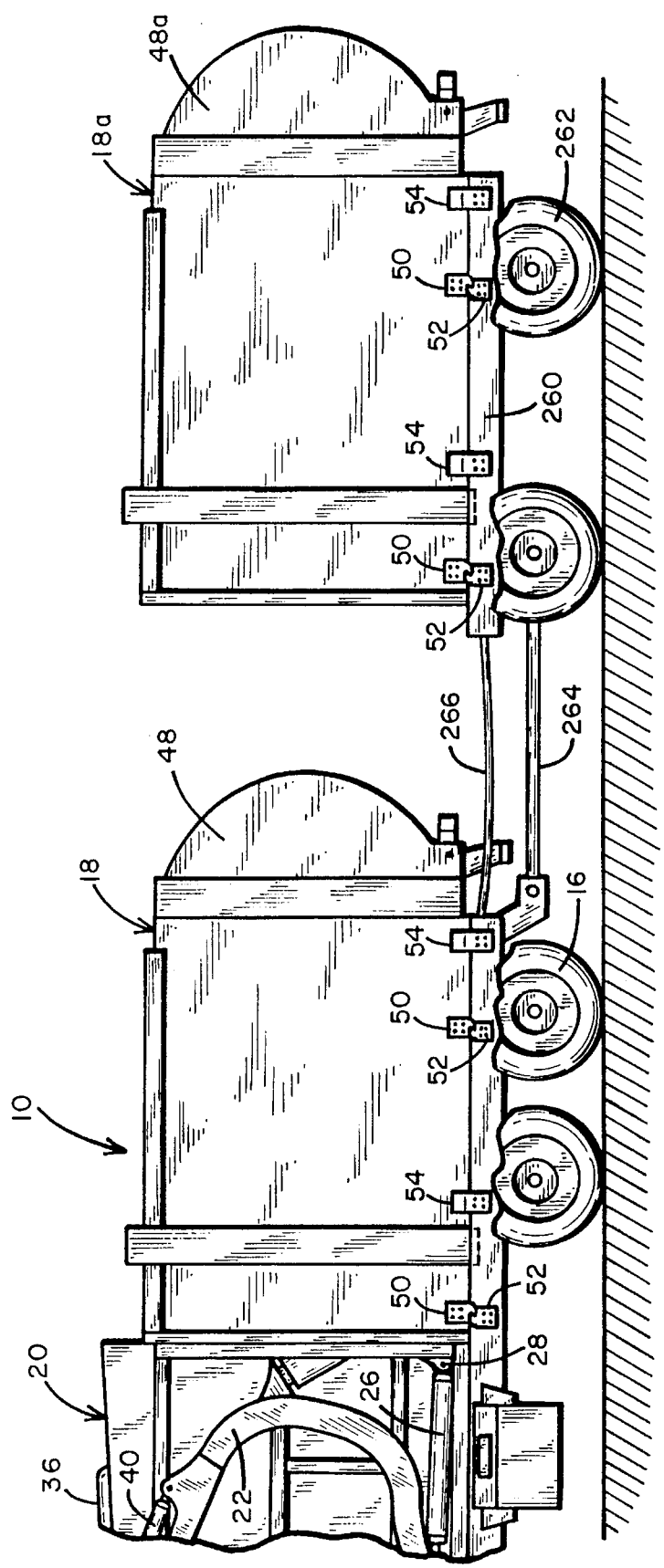

2

DETACHABLE TRUCK BODY AND HANDLING MECHANISM

CROSS-REFERENCE TO RELATED APPLICATION

This is a continuation-in-part of application Ser. No. 08/377,146, filed Jan. 24, 1995.

BACKGROUND OF THE INVENTION

I. Field of the Invention

The present invention is directed generally to an automated self-contained system for employing and rapidly exchanging chassis-mounted truck bodies or modular containers and, more particularly, the invention involves a system that utilizes a mechanized sub-frame that lifts to remove or mount the body and tilts to unload the contents of the truck body which is integral with and operable using power from the truck chassis itself. The system is capable of interfacing with self-supporting or unsupported body modules.

II. Description of the Related Art

Truck-type vehicles generally include a heavily constructed structural chassis frame which provides the cab and the truck body support structure and includes the engine, drive train and associated hydraulic systems and/or other power take-off mechanisms. The chassis are generally combined with a permanently mounted single-function body. Thus, a chassis designed to support a permanently attached delivery box, dump body or other special-function device such as a refuse compaction body is limited to that function once assembled. Even where the single function is all that is desired, such as with the collection and transport of refuse, much of the working time of the vehicle is spent traveling to and from landfills to empty full containers.

Common types of refuse trucks include front-end loading and side loading embodiments in which the refuse is compacted rearward and removed and discharged through a rear access. The front-end loading version is particularly adapted to pick-up and dump large commercial refuse containers or storage bins in which the filled container is addressed at the front of the truck, picked up by a pair of side mounted lifting arms and fork arms which engage the container to raise it above the storage body of the refuse truck and invert it to dump its contents into a top opening in a truck body just behind the cab. The sequence is then reversed and the empty refuse container is returned to the ground. The material received from the storage container is then compacted through the rearward movement of a compaction panel within the storage body. In the receiving position, the compaction panel is positioned forward of the top opening and after the refuse is received in the body, the panel is advanced rearward to propel and compact the refuse into a rear storage section and against a heavy tailgate which is hinged to the storage body to close a rear discharge opening. After the rearward movement of the compaction panel to pack the refuse, the panel is again moved forward and positioned to address and compact new refuse.

In this manner, the rear portion of the storage container eventually becomes completely filled with compacted refuse. At this point, the truck containing the filled refuse container must be driven to a landfill or other point of discharge which may be many miles away to be unloaded before it can be returned to service to pick up additional refuse. The time required for driving to and from the loading and the unloading site, of course, is wasted or "down" time with respect to collecting refuse.

The refuse truck represents or illustrates one type of specialty-use vehicle which could be utilized much more efficiently and effectively were the time directed to transporting and unloading the refuse reduced during collection hours. If the traditional dedicated permanently fixed refuse receiving and compacting truck body could be replaced by an easily exchangeable truck body temporarily connected to the truck chassis for refuse collection such that each filled container could be disconnected quickly, left at a convenient location and replaced by an empty container, the truck could be kept in service virtually the entire usable refuse collecting time and the efficiency of the collection operation could be greatly enhanced.

Methods and devices have been proposed for interchanging various truck body configurations on a single chassis. In this manner, it has been suggested, for example, to exchange such diverse configurations as a dump body, tank body and stake body on a single chassis to transform a single-use vehicle to a multi-use device. Devices designed to allow quick release coupling of interchangeable bodies which may be the same body design include devices such as that illustrated and described by Williams in U.S. Pat. No. 4,456,414, which uses a system in which a plurality of interlocking hooks and tabs provided on a chassis and the truck body are engaged by moving the truck body horizontally along on the chassis using external means. A latch pin, or the like, prevents dislodgement of the body from the chassis once in place. While this system does provide for a quick-releasable positive hold-down for the truck body, no mechanized means are provided on the truck itself to accomplish the latching and unlatching, which must depend on means external to the truck.

Other devices accomplish latching and unlatching using tilt mechanisms and other systems which require the truck to be addressed by large external devices to move the vehicle body relative to the chassis. None of the prior devices provides a simple chassis-mounted, self-contained automated system capable of exchanging truck bodies on a chassis.

It therefore is an object of the present invention to provide a vehicle-mounted, self-contained container handling apparatus for receiving, engaging and releasing containers which may be truck bodies, or the like, capable of locking and unlocking a container.

It is a further object of the present invention to provide a container handling apparatus for removing and mounting containers which is also capable of unloading the containers by tilting.

A still further object of the present invention is the provision of a container handling apparatus for removing and mounting truck bodies which is self-aligning.

Another object of the invention is to provide an auxiliary tilt frame to be secured to a chassis that uses the same mechanism to unload a truck body by tilting and to lift and remove or mount the truck body.

Yet another object of the invention is to provide a truck-mounted container handling apparatus for removing, mounting and unloading a container that requires only one sub-frame system to accomplish these functions.

A yet still further object of the invention is to provide a container handling system that does not require the mounting of any components to the outside surfaces of the truck chassis.

Other objects and advantages will occur to those skilled in the art in conjunction with an appreciation of the present specification and claims.

SUMMARY OF THE INVENTION

The present invention provides an improved autonomous, automated vehicle mounted container handling system for rapidly exchanging, i.e., receiving, engaging, locking and separating replaceable modular containers, which may be task-specific truck bodies, such as refuse hauling receptacles, on a supporting truck chassis. The apparatus is designed to be a stock assembly integral with the truck chassis such that all mechanized elements are powered from and carried on the truck chassis. In this manner, location guiding, locking, unlocking and separation devices may be conveniently contained on the chassis.

According to one embodiment, a container grabbing and locking mechanism includes one or more rotating eccentric cam latches associated with one or more transverse horizontal axles supported by longitudinal chassis frame members and horizontally engaging locks. Each eccentric cam has an open latching slot or recess designed to capture a corresponding latch bar means fixed to the container. Cam rotation not only secures each nested latching bar into the corresponding slot but also shifts the bar or bars horizontally to propel or slide the container into a locked position with a horizontal lock. In another embodiment, a protuberance on the bottom of the container or truck body engages an opening in an horizontally movable plate which is operated by a fluid cylinder to move the container in and out of a locked position. A positive mechanical locking means may be provided to lock each cam or operating fluid cylinder in the securing position to prevent unwanted dislodgement of the container during use as by loss of fluid pressure.

Container locking systems that may be employed include interlocking mating "hook" devices which latch and unlatch based on horizontal travel of the container relative to the support frame to secure or lock the container to the frame or chassis in accordance with horizontal container displacement in the operation of the eccentric cam system, moving plate or other system. In the locked position, pairs of side mounted interlocking elements or hook devices fully engage to provide a positive hold down or lock between the container or truck body and the frame or chassis. Reversed operation of the mechanism produces reverse displacement of the container or truck body thereby disengaging the pairs of side mounted interlocking elements to allow separation of the container.

Lifting and support devices provide temporary transfer support for the container or truck body to facilitate an exchange clear of mechanisms and other chassis parts. One embodiment includes pairs of aligned, oppositely disposed, spaced fluid-operated cylinders, attached to the sides of the chassis and designed to operate vertically against plates or brackets fixed to the body such that extension of the cylinders provides four-point lifting support. In another embodiment, convex pivoting lifting arms are employed instead of the vertical cylinders to operate in conjunction with matching concave upper container-mounted lift brackets to provide a self-aligning lift system that keys the container/chassis into the proper orientation. The pistons of the piston-cylinder lifting elements or lifting arms extend so that the bottom of the container or truck body, once raised, vertically clears chassis parts and mechanisms that could interfere with removal.

In yet another embodiment, a mechanized sub-frame is attached to the chassis that is capable of both tilting and lifting the container or removable body in a mechanical sequence that can be used to unload the contents of the truck body by tilting and also remove or mount the truck body using the same sub-frame system to accomplish all the necessary motions. This embodiment does not require cylinders or guiding devices to be mounted on the outside surfaces of the truck chassis frame. The sub-frame further provides continuous support for the removable body along its entire length when the body is lifted or lowered and the need for discrete alignment and lifting mechanisms is eliminated.

The container or truck body may be provided with independent means of support deployable with the truck body or container in the lifted position. For example, pivotal, removable or telescoping legs attached thereto, optionally with feet, may be deployed on either side of the container allowing the lifting devices to be retracted leaving the container independently supported and enabling the chassis to move away from under the container.

An unloaded chassis can readily be positioned with respect to a free standing container which can be quickly mounted on the chassis by reversing the steps of the disconnecting sequence. Discrete alignment or guide means such as flared gussets or self-aligning brackets may be provided to facilitate the alignment of the truck body with the chassis where needed.

In this manner, a filled refuse body, for example, can be dropped at a convenient location and later reloaded onto the same or possibly a different chassis for removal to a remote landfill, or other place of load disposal, or loaded onto a different type of vehicle, possibly one designed for carrying a plurality of such containers to be emptied. A separate trailer may be also provided to transport a second replaceable truck body behind the mounted one. Also, in the case of the embodiment having the independent sub-frame, a dumping arrangement is integrally provided to tilt truck bodies for emptying.

The invention also contemplates the independent exchangeable container or truck body itself, which may or may not have independent means of support but which, in any event, are separate exchangeable modules and which may be designed for receiving and discharging compacted refuse, for example.

BRIEF DESCRIPTION OF THE DRAWINGS

In the drawings, wherein like reference numerals refer to like parts throughout the same:

FIG. 8 is a fragmentary, exploded, perspective view showing another guiding and locking mechanism in accordance with the invention;

FIGS. 12 and 13 are fragmentary views illustrating a system of detachable support legs;

FIG. 14 represents an alternate embodiment to the refuse truck of FIGS. 1 and 2 including a trailer carrying a second exchangeable truck body;

DETAILED DESCRIPTION

It will be appreciated that the vehicle mounted container handling apparatus of the invention represents a system that can be entirely self-contained with respect to a vehicle chassis. Thus, the entire exchange operation including receiving, engaging, locking and releasing of containers such as truck bodies or the like, can be accomplished utilizing the invention in conjunction with self-supporting containers or truck bodies without the need for any external means. It is further contemplated that the invention has broad application and will readily adapt to a variety of chassis/truck body or container applications. While the detailed description contained herein is particularly directed to refuse vehicles of rearward compacting types, this is meant purely by way of example and not limitation.

Figure 1:
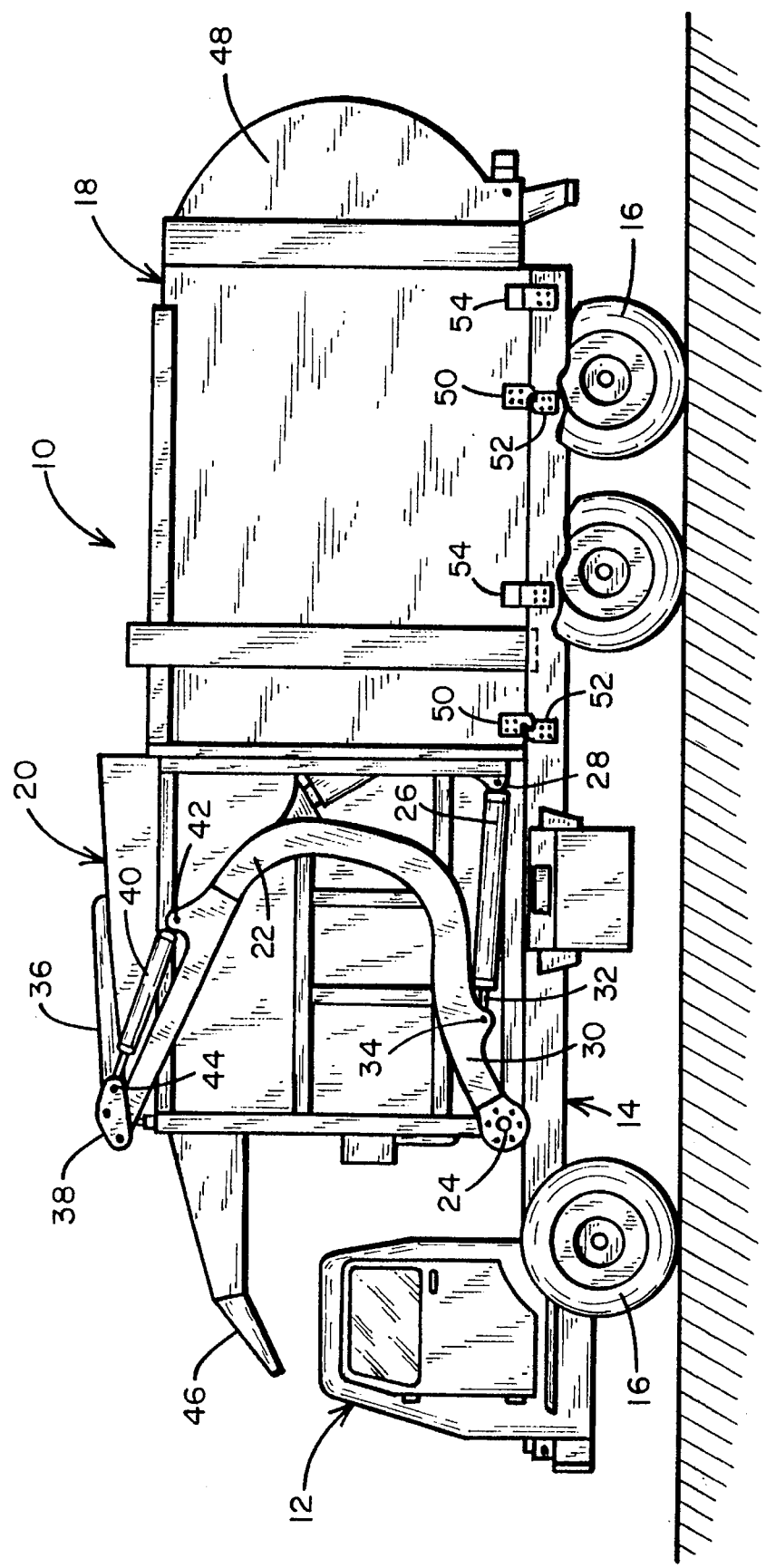
FIG. 1 is a representation, with parts broken away, of a side view of a front-end loading refuse truck with a removable refuse body fully locked to the chassis.
Figure 2:
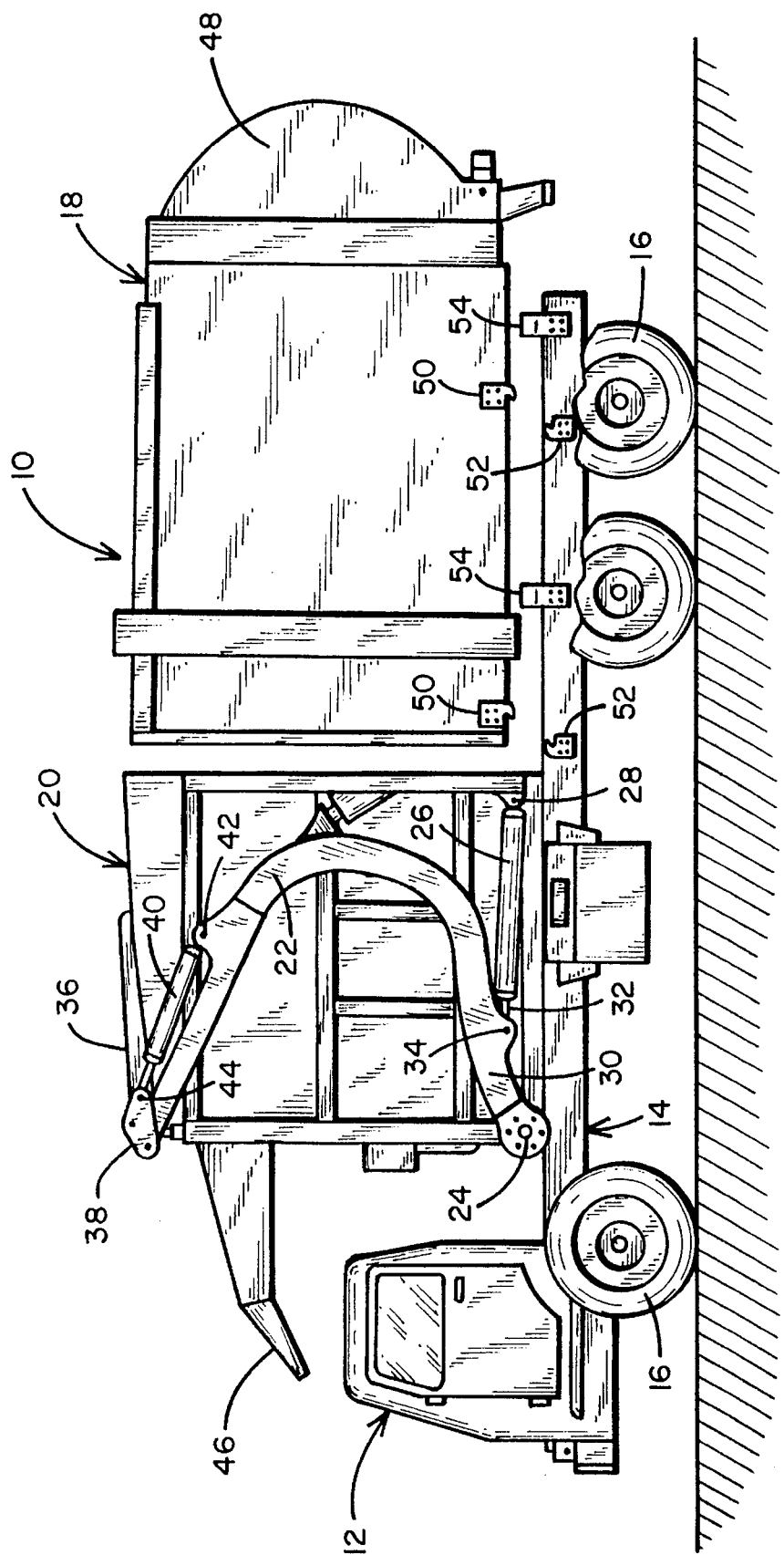
FIG. 2 is similar to FIG. 1 with the removable refuse body separated from the chassis.

In accordance with describing certain preferred and illustrative embodiments of the present invention, reference is made to the accompanying drawings and, initially, with particular reference to FIGS. 1 and 2 thereof. FIG. 1 illustrates a front-end loading rearward compacting refuse vehicle 10 which includes a cab section 12 mounted on a chassis 14 supported by a plurality of wheels 16. The vehicle includes a modular refuse storage container 18 mounted behind a receiving/compacting section 20. In this embodiment, the receiving/compacting section 20 including an hydraulic compacting system is permanently mounted on the vehicle chassis 14. The exchangeable refuse container or exchangeable truck body is the modular refuse storage container 18.

A pair of lifting arms, one of which is shown at 22, may be mounted on the forward section of the truck body 20 or on the chassis 14 using pivotal mountings 24. Hydraulic cylinders 26 supported through pivotal clevis mountings as at 28 are connected to lever arm portions of the lifting arms 22 through piston rods 32 with pivotal mountings 34. As can be seen from the illustration, the cylinder 26 is fully contracted and the system is in its fully retracted position. Expansion of the cylinders 26, and thereby extending rods 32, causes the lift arms 22 to move forward, and deploy for picking up a full container or setting down an empty container.

The outer ends of the lift arms 22 are provided with fork arms 36 connected by pivotal mountings 38 with the fork arms 36 being rotatable with respect to the lifting arms 22 to the expansion or contraction of a pair of hydraulic cylinders 40 secured to the lifting arms through pivotal mountings 42, 44. Operation is pivotal as the fork arms 36 together with the lifting arms 22 cooperate in a well-known manner to engage, lift and invert a refuse container to be dumped into the hold of the refuse receiving section 20. A protective hood 46 is positioned to protect the top of the cab from any hazards associated with lifting and dumping containers.

Figure 3:
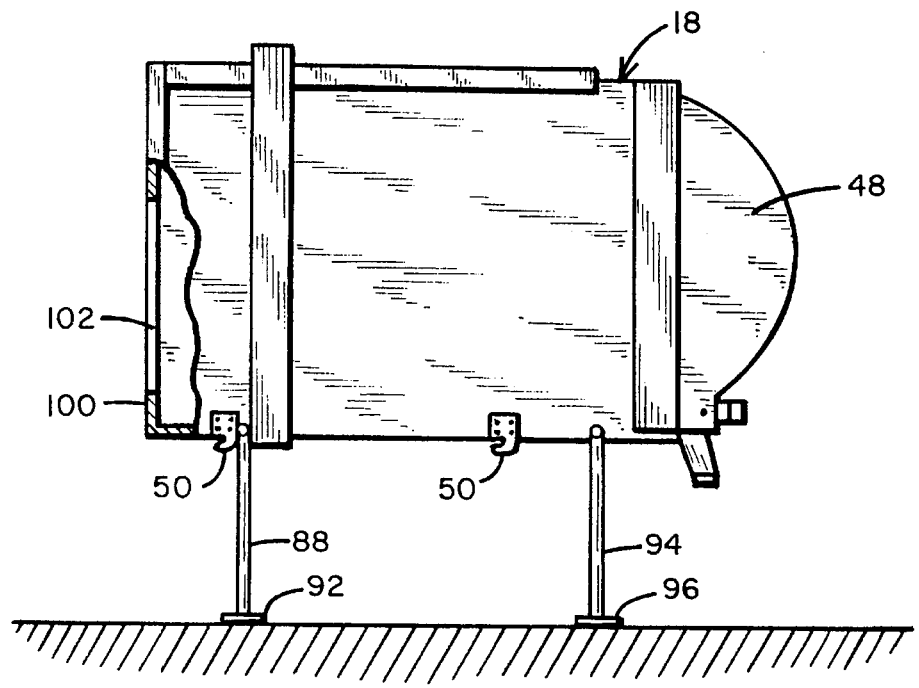
FIG. 3 is a side view depicting the refuse body of FIGS. 1 and 2 as self-supporting.

Within the truck body, the refuse receiving section 20 further contains a mechanical compacting system in which a vertically disposed sweep blade (not shown) engages and pushes the material in the permanent receiving section 20 rearward into the exchangeable storage container 18 in a conventional and well-known manner. As can be seen in FIG. 3, the central portion of the front of the container or refuse body 18 is open to receive refuse being compacted in the rearward direction. The container further includes a conventional vertically pivoted hinged discharge door 48 designed to withstand the extreme forces associated with repeated rearward hydraulic compression of the refuse in the removable body 18.

In accordance with the latching system of the invention, the removable refuse body 18 further includes pairs of spaced locking means 50, preferably horizontally engaging hook means, designed to interlock with matching hook means 52 fixed to the chassis 14. The system is shown in the fully engaged or locked position in FIG. 1. In FIG. 2, the detachable refuse body has been displaced horizontally (rearward) and vertically and is shown in the fully raised detached position with the pairs of interlocking hooks 50 and 52 disengaged and separated.

A schematic representation of details of the container handling mechanism illustrated in FIGS. 1 an 2 are better shown in FIGS. 4a–4c, 5a and 5b, 6a–6c, and 7–11. In FIG. 5a, a chassis frame is depicted that includes a pair of main longitudinal structural channels 60 and 62 spaced laterally by transverse members as at 64. A further transverse member 66, which may be a rod or axle-type member, carries a single eccentric cam member 68 with open slot 70 journalled thereon for rotation about the member 66. The cam is operated by a double acting fluid-operated cylinder 72 with piston 74. Further pairs of cylinders, a member of one pair being shown at 76, with vertically adjustable pistons 77, are provided in oppositely disposed aligned spaced relation and fixed to chassis members 60 and 62.

The minor fractional section of the removable container or truck body section 18 depicted in the exploded view of FIG. 5a includes spaced parallel lower longitudinal structural frame members 78 and 80 spanned by a transverse or cross-latching member 82 which may be a bar. Lifting gusset members as at 84 are provided arranged in oppositely disposed aligned pairs, disposed to align with the pistons 77 when the container is in the unlatched receive/release position.

The removable container 18, when free of the chassis, may be supported independently from pairs of deployable supports, one of which includes legs 86 and 88 with attached feet 90 and 92, respectively. A second pair of support members including leg 94 with foot 96 are shown in FIG. 3, which further depicts a truck body in the independent self-supported mode. In the broken segment, the front panel 100 is shown as ending at 102, the front portion 102 being open for the reception and compaction of refuse.

Figure 5A:
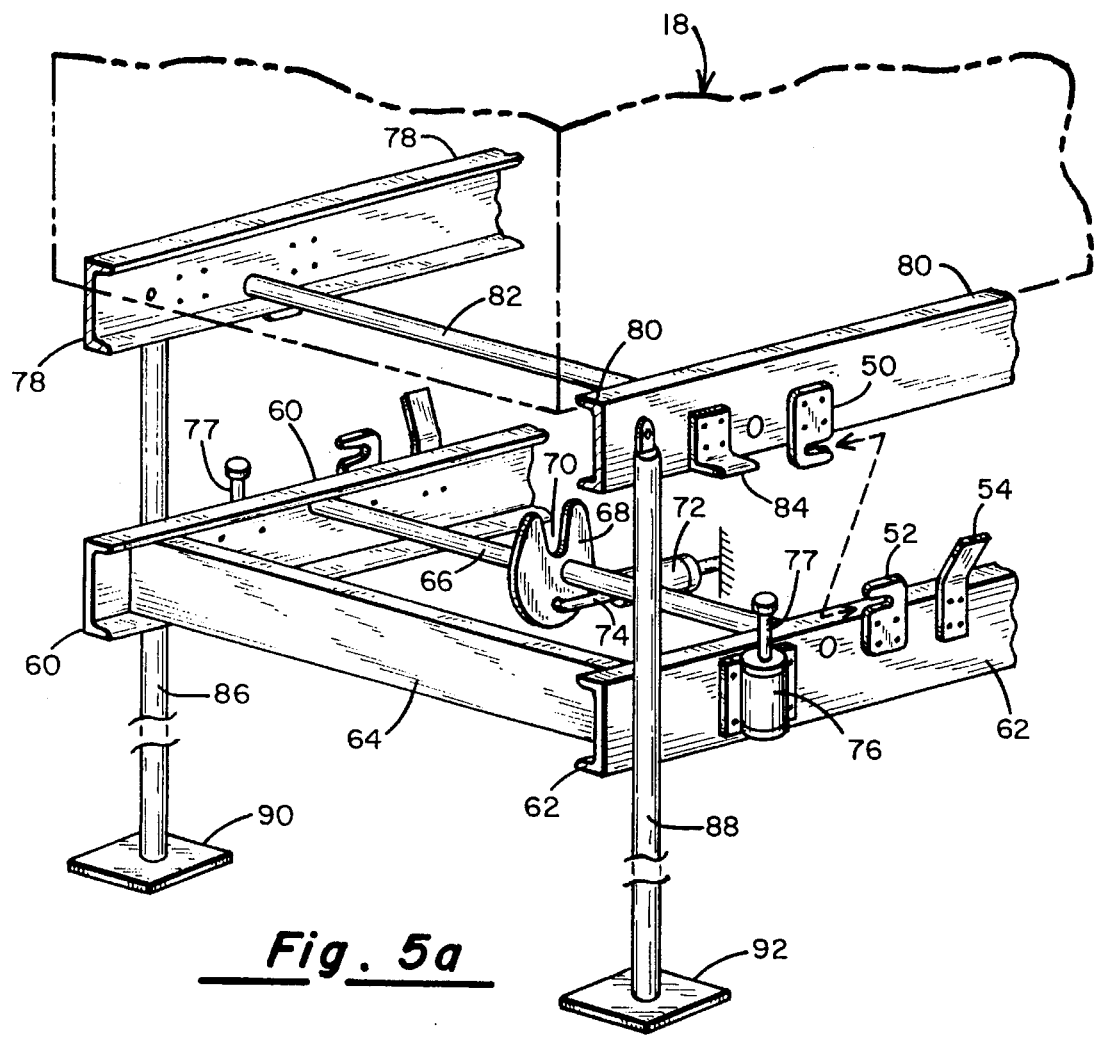
FIGS. 5a and 5b are fragmentary, exploded, perspective views showing exemplary alternative embodiments of an eccentric cam latching/locking and a separate and independent support and lift mechanism in accordance with the invention.
Figure 5B:
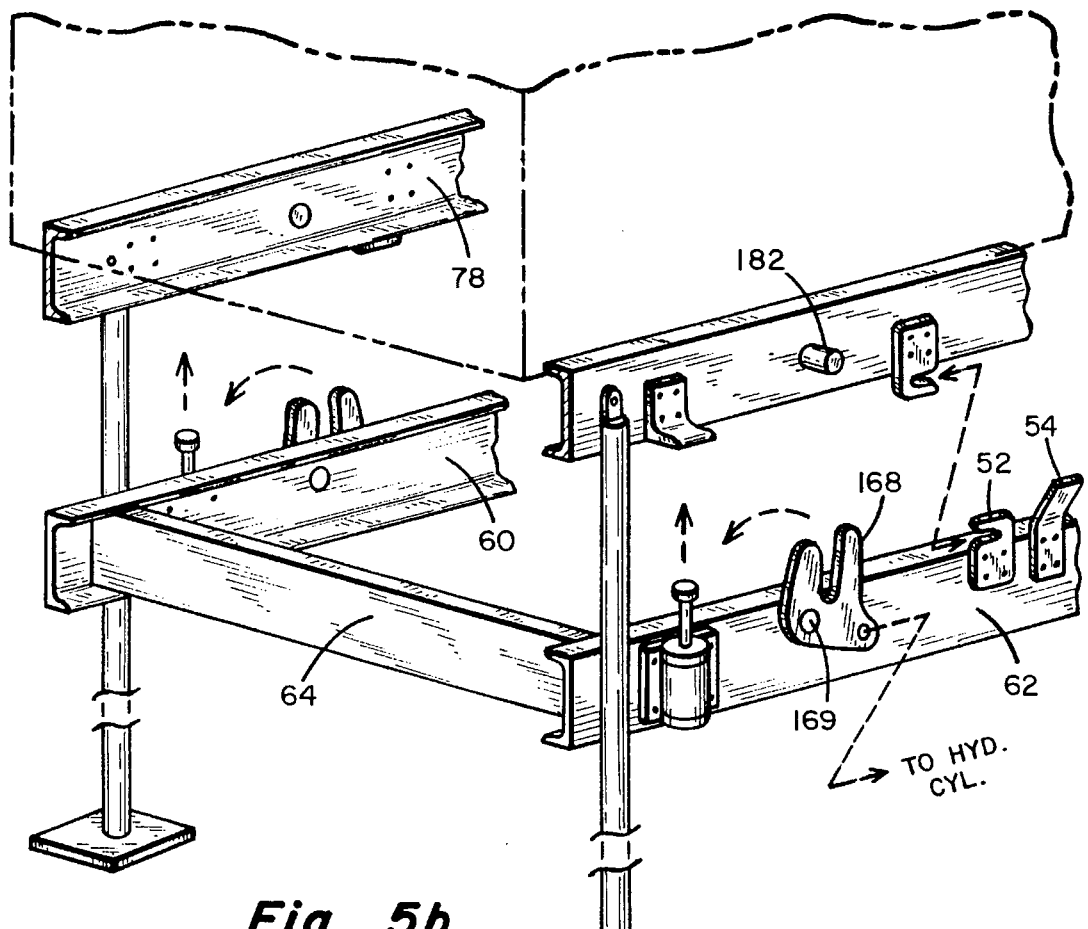

FIG. 5b depicts an alternative cam arrangement for the chassis/container system of FIG. 5a utilizing a plurality of oppositely disposed spaced cam members 168, which are designed to operate rotating about or with a mounting shaft 169 in the manner of cam 68 as previously described. Stub latching bar members as at 182 may be used instead of continuous bar as at 82. The exact number and location of the cams, locking means 50/52 and support piston-cylinders 76/77 or equivalent mechanical means for receiving, engaging and locking, and releasing the containers in accordance with the preset invention may vary according to the design and application.

Figures 6A, 6B:
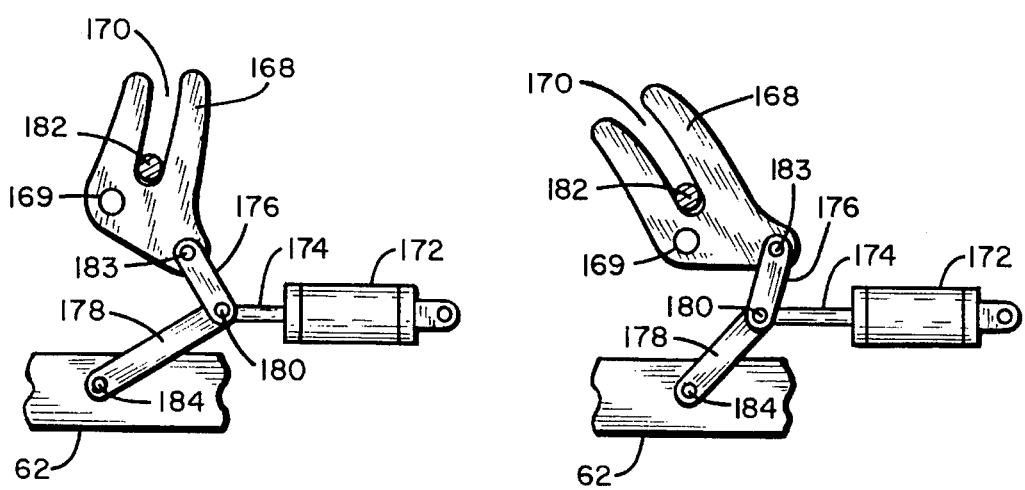
FIGS. 6a–6c illustrate a type of over center locking linkage mechanism suitable for locking rotating cams as shown in FIGS. 4a–4c and 5a and 5b.
Figure 6C:
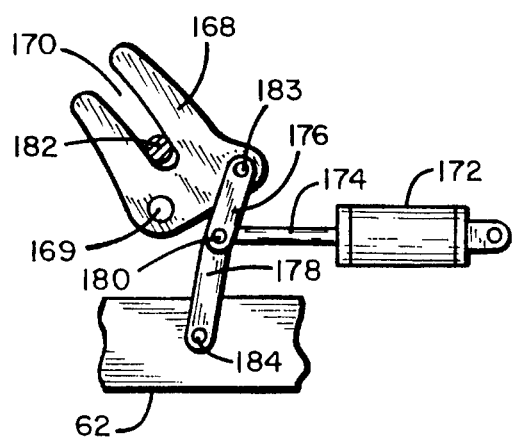

A locking device may be provided to prevent untimely rotation of any of cam members 68, 168 should the pressure be lost in the fluid operated cylinders 72, 172, etc. FIGS. 6a–6c illustrate one possible locking device of a type commonly referred to as an over-center linkage that can be used with the cams. While universally applicable, it is illustrated particularly with regard to cams 168. Each rotating cam 168 having slot 170 is connected to piston rod 174 of double-acting cylinder 172 via a linkage including arm members 176 and 178, in which one end of each pivotally connect together and to the piston 174 as at 180, the free end of member 176 further being pivotally connected to the cam 168 at 183 and the free end of member 178 pivotally fixed to the truck chassis as at 184.

The cam linkage operates between a straight (locked) and a folded configuration, as shown, but is capable of bending only in one direction. FIG. 6a shows the system with the slot 170 substantially in the engage/release position with the piston rod 174 substantially in the retracted position and the linkage folded. In FIG. 6b, the piston is partially extended and the slot 170 has engaged the bar 182 and moved part way toward the locking position. The view 6c shows the linkage in the aligned, fully locked, position, the cylinder being fully extended. In this position, the corresponding hooks 50/52 are fully engaged and vertical movement of the container is precluded. Only horizontal displacement will disengage the hooks. It should be noted that even should the cylinder 172 lose pressure, any force tending to horizontally displace the container in a manner to disengage the hooks would tend to rotate the cam 168 to the right and this will be opposed by the locked linkage.

Figure 4A:
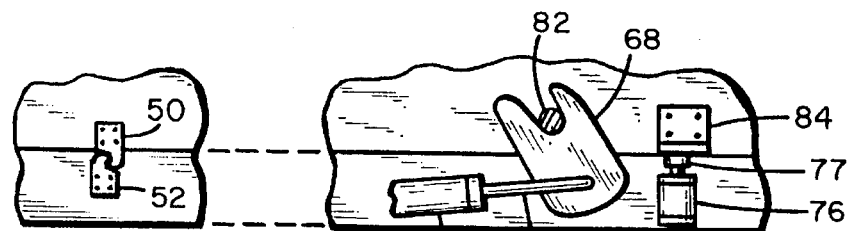
FIGS. 4a–4c represent fragmentary details of a possible eccentric cam of latching/locking mechanism, respectively, in the locked, unlocked and unlocked/separately supported position.
Figure 4B:
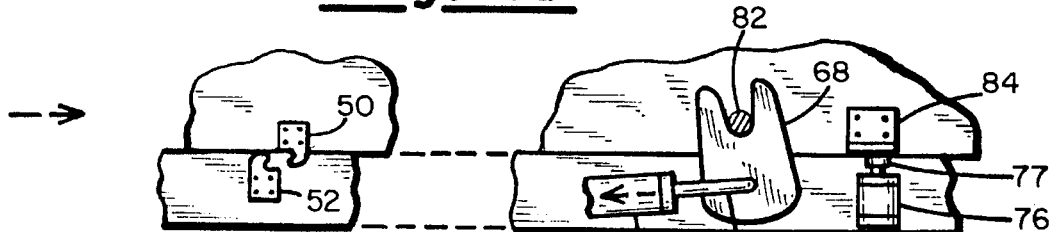
Figure 4C:
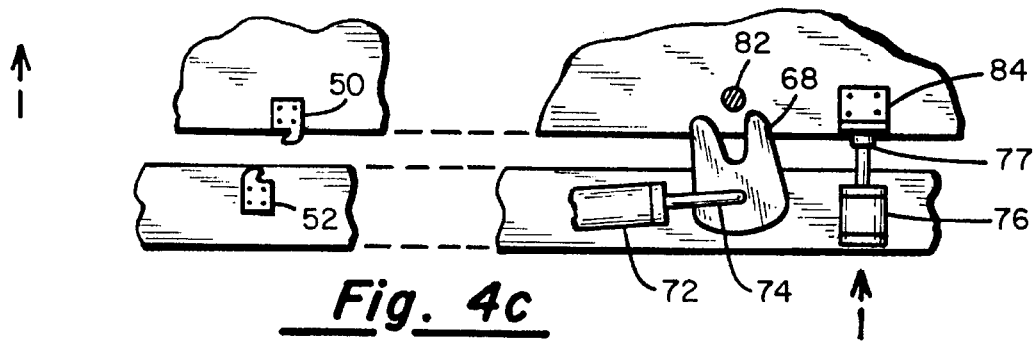

FIGS. 4a–4c are simplified schematic representations of the operation of the container handling system in accordance with one embodiment of the invention. The cylinder 72 is shown on the reverse side of cam member 68 for reasons of illustrative convenience. The operating sequence, assuming an "empty" chassis, will next be described.

FIG. 8 depicts an alternative to the cam arrangement for the chassis/container system of FIGS. 5a and 5b in the form of a spur or tongue and plate latch arrangement. A wedge-shaped tongue member 190 carried by a rigid structural transverse member 192 spanning the longitudinal members 78 and 80 on the removable container or truck body 80 is designed to be received and aligned within a corresponding opening 194 in an horizontally disposed transverse heavy metal plate or channel 196. The member 196 is slidably mounted between the flanges of the longitudinal chassis members or chassis rail members 60 and 62 operable by one or more double-acting fluid cylinders as at 198. The opening or hole 194 in the member 196 is advantageously somewhat larger in size than the spur or tongue member 190 to allow or compensate for positional variations or minor misalignments which may occur between the chassis and the container or body to be received. Once the truck body is lowered into place, the slidable member 196 moves fore and aft to shift the removable body on the truck chassis guided by the chassis rails, as shown, or alternatively by a sub-frame above the truck chassis (not shown) to engage and disengage the hooks 50/52.

Figure 7:
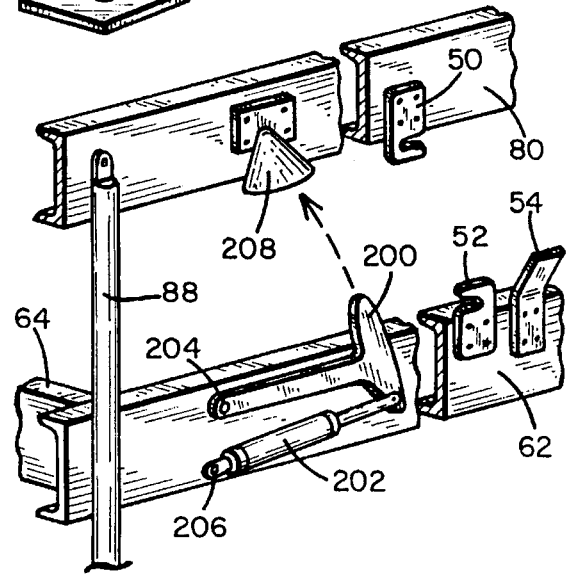
FIG. 7 is a further fragmentary, exploded, perspective view showing an alternate lift and aligning mechanism.

FIG. 7 depicts an alternative truck body or container lifting mechanism employing a pivoting lifting arm 200 manipulated by a fluid-operated lifting cylinder 202. Both the lifting arm and the lifting cylinder are pivotally mounted as at 204 and 206, respectively. The lifting arm 200 is provided with a self-aligning generally upwardly directed pointed end which is adapted to engage a corresponding concave self-aligning upper bracket 208 attached to the structural member 80 of the container or truck body. This embodiment of the lifting mechanism has the advantage that when it lifts a truck body or container that is being supported on its own legs, for example, the body will key into the proper orientation both side to side and fore to aft relating to the chassis. Of course, the body and chassis must be in the acceptable range or related position such that when lifting arm 200 raises, it will enter the bracket 208 so that the truck body can be raised or lowered. The arrangement of FIG. 7 further reduces side forces associated with lifting cylinders of the type in FIGS. 5a and 5b produced by a slightly misaligned chassis or container. This embodiment further eliminates the need for the guide members 54 in addition to the lifting cylinders and gussets or brackets shown in FIGS. 5a and 5b. Of course, the mechanism of FIG. 7 can be used with any of the body positioning and locking devices such as the rotating cam system and the spur and plate system utilizing the side latching and locking hooks 50 and 52 or the latch pin system (FIGS. 9a and 9b) discussed next below.

Figure 9A:
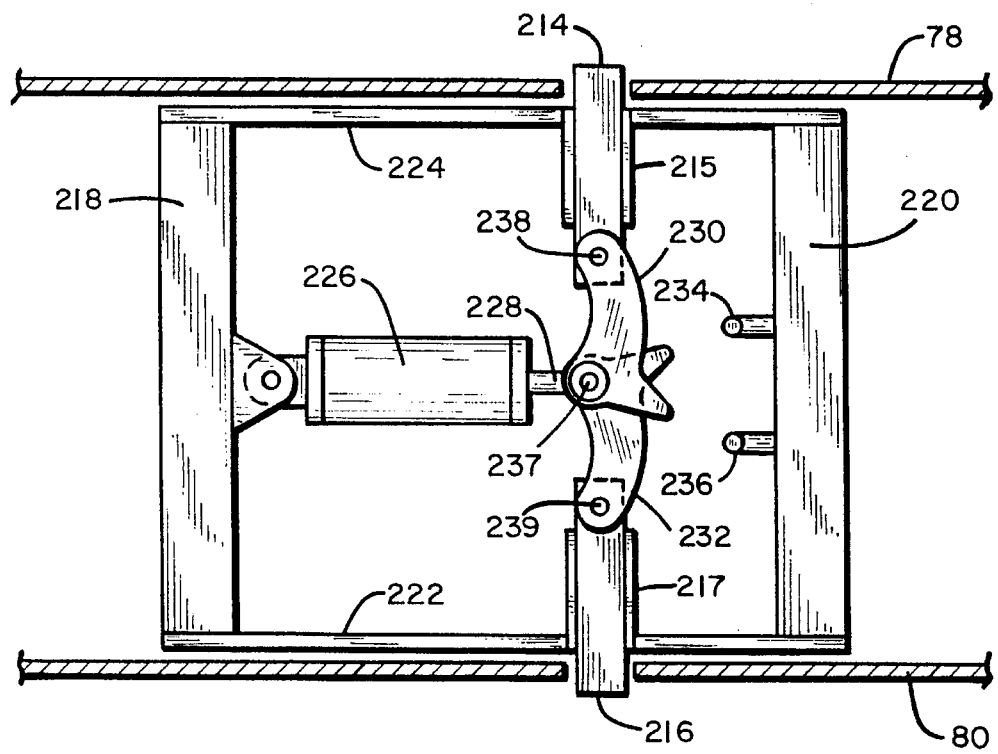
FIGS. 9a and 9b are plan views, partially in section, depicting an alternative locking mechanism shown in the locked and unlocked positions respectively.
Figure 9B:
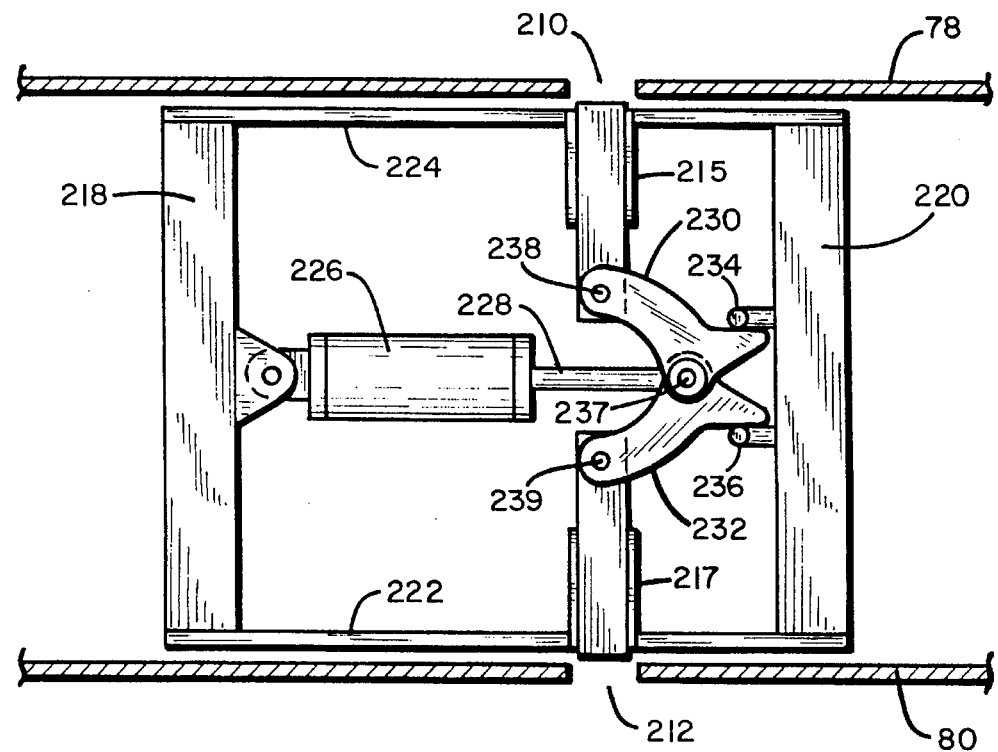

An alternative locking system is depicted in FIGS. 9a and 9b in which FIG. 9a depicts the chassis/truck body system in the locked position and FIG. 9b, in the unlocked position. This system includes locking openings in removable body longitudinal frame members 78 and 80 which are designed to accommodate large latch pins 214 and 216 which ride in guide tubes 215 and 217, respectively, which, in turn, are carried by a sub-frame fastened to the chassis frame and including a pair of parallel transverse members 218 and 220 spaced by parallel longitudinal members 222 and 224. The transverse structural member 218 carries and supports a double-acting, fluid-operated cylinder 226 which, in turn, with rod 228, operates a pair of centrally-connected, pivotally mounted connecting links 230,232 which cooperate in a scissor linkage in conjunction with a pair of guide rods 234 and 236 to extend and withdraw the latch pins 214 and 216 along guide tubes 215 and 217. In the fully unlocked position, the projections of the connecting links 230 and 232 are nested between the guide rods 234 and 236 and the piston 228 of the cylinder 226 is fully extended. When the body locking mechanism is actuated to lock a body or container on the chassis, the cylinder 226 is actuated to withdraw the piston 228. The projections on the connecting links act to center the latch pin system so that both latch pins withdraw the same distance. As the rod 228 is withdrawn, the pivot point 237 is advanced toward the cylinder 226. As shown in FIG. 9a, when the locking pins 214 and 216 are in the fully extended position extending through the openings 210 and 212 fully locking the chassis and body together, the pivot point 237 has been withdrawn to a point beyond the center line between the pivotal connections 238, 239 between the locking pins and the connecting links so that the pivot point 237 itself is in an over-center locked position such that thereafter inward forces acting on the locking pins 214, 216 will not cause the cylinder to extend to an unlocked position.

Figure 10:
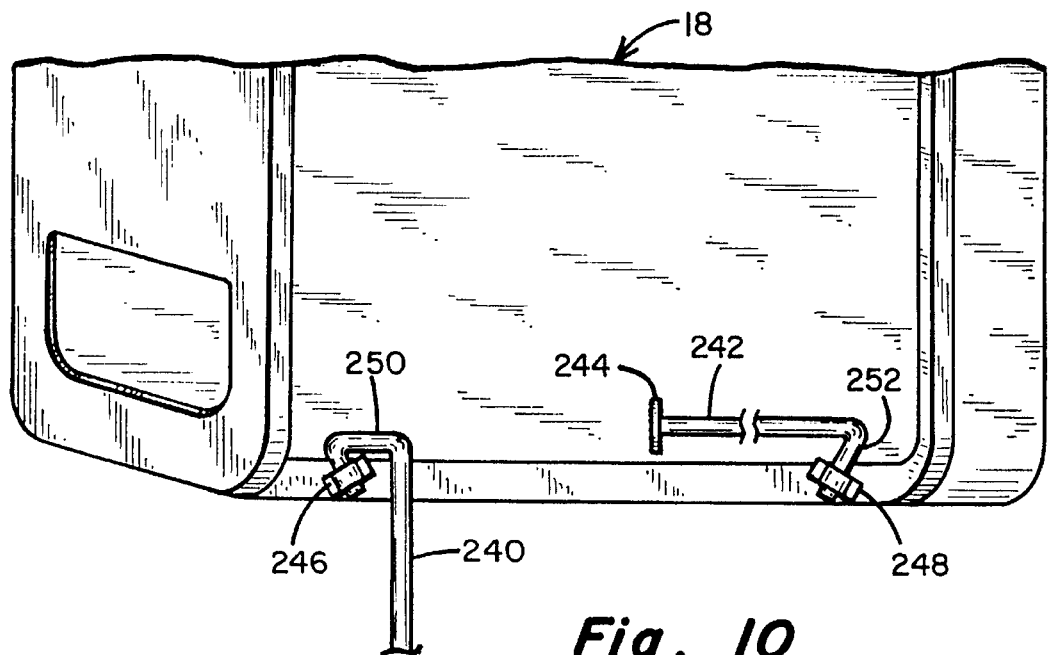
FIGS. 10 and 11 are fragmentary views depicting the deployment of pivoting support legs in accordance with one embodiment of the invention.
Figure 11:
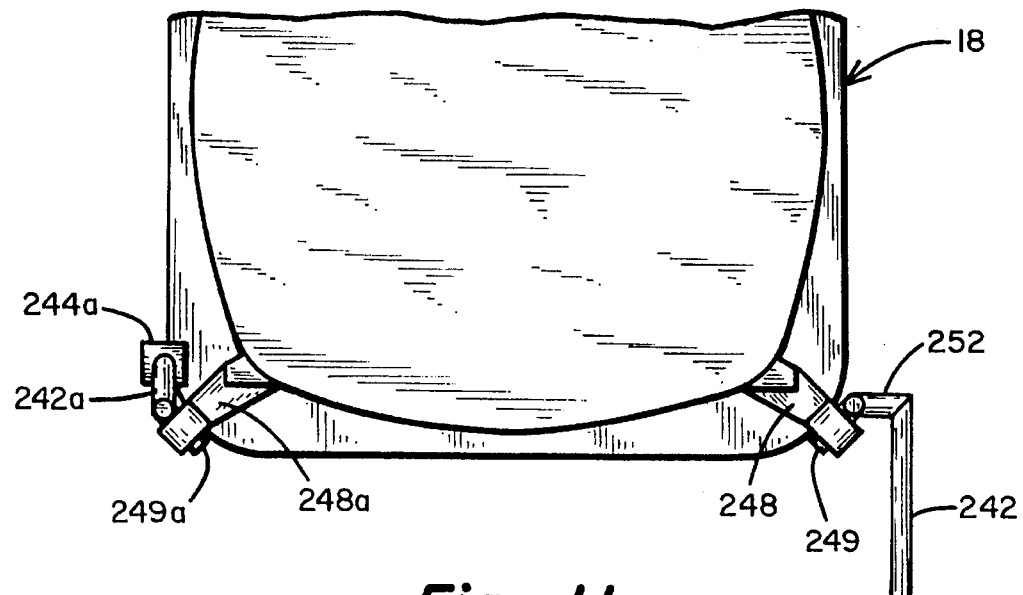

FIGS. 10 and 11 depict views of one system for deploying the support legs for the truck body or container in accordance with the invention. In this manner, a front leg 240 shown broken and a back leg 242 with foot 244 are shown as pivotal about inclined pivot housing tubes supported by mounting brackets 246 and 248, respectively, which may be 45° or other convenient angle. Both pivot tubes have an inward and downward inclination and feature a bottom end 249 rotatable on an inclined axis. Each support leg is provided with an offset segment as at 250, 252 between the leg axis and the pivot axis so that the legs will store close to the body 18 but extend in a manner which allows them to laterally or transversely clear the truck chassis as best shown in the fractional end view of FIG. 11. This allows for easy deployment and retraction. The leg opposite 242 is depicted in its retracted position as 242a with foot 244a and inclined pivot mounting bracket 248a and rotating member 249a. This allows for easy pivoting for both deployment and stowing of the truck body support legs in accordance with the invention.

FIGS. 12 and 13 depict the use of detaching support legs 254 with feet 257 which support the truck body by means of fixed support brackets 253 with shaped openings 255 and associated leg support pins 256. The legs are simply attached or detached by hand when the body is in a raised supported position. The shape of the openings 255 retains the pins in place when weight is applied.

To load a truck body, the chassis is first positioned underneath a body to be attached, typically one self-supported as shown in FIG. 3. In this position, and with respect to the embodiment of FIGS. 5a and 5b, the truck body is aligned using guides 54 and positioned so that lift pistons 77 are aligned vertically with lifting gusset members 84. The pistons 77 are extended in unison to engage the gusset members 84 and lift the body off of the leg supports which can then be retracted or swiveled out of the way in a well-known manner. The truck body is then carried by the extended pistons 77 above the chassis of the truck.

Utilizing the single or multiple rotating eccentric cam locking system, with the slot of the cam, or plurality slots and cams, as the case may be, e.g., slot 70 of cam 68 in the vertical receive/release position (FIGS. 4b, 5a), the pistons 77 are then retracted lowering the container body onto the chassis, the latch bar or transverse member 82 received in the slot 70.

Of course, the system depicted in FIG. 7 can be used in the alternative, and is more readily adaptable to slight misalignment of the chassis and the body to be loaded and locked on the chassis. Using this arrangement, the chassis is positioned underneath the truck body or container to be secured such that the self-aligning upper brackets 208 are positioned above the pointed ends of the lifting arms 200. The lifting arms 200 are then raised and the self-aligning conical shape of the upper brackets will cause the truck body to key into the proper orientation, assuming that the chassis is aligned close enough so the lift arms will engage the conical brackets. Using the lifting arms, the body is then lifted off of the support legs and they may be withdrawn or pivoted to a stowed position. The lifting arms can then be lowered and the truck body to be fitted onto the chassis will automatically self-align to the proper position on the chassis for locking.

The system is provided with any necessary appropriate interlocks so that the system functions as desired. For example, each cam as at 68, 168 must be in the proper receive/release position prior to the lowering or raising the truck body using the vertical piston/cylinder or lifting arm arrangements. In this position, the hook means 50, 52 are aligned in relation to slidably engage but are still separated (FIG. 4b). The piston 74 is then used to rotate cam to the latched or locked position (FIG. 4a) thereby positively latching the member 82 in the slot 70 preventing horizontal displacement of the member 82. As the cam member 68 rotates from the open or receive/release position of FIG. 4b to the latched position of FIG. 4a, the member 82 and so the entire truck body 18 is displaced an amount horizontally with respect to the chassis. This horizontal displacement causes the engagement or interlocking of the members 50 on the body with the members 52 on the chassis thereby securing the truck body to the chassis. A locking device such as the over-center locking linkage (FIGS. 6a–6c) prevents undesired displacement of the container relative to the chassis during use.

If the spur or wedge and plate system be employed for moving the truck body relative to the chassis in order that it be locked in place, any of the raising and lowering systems may be employed along with the interlocking hook locking mechanism or, in the alternative, a system such as the extending latch pin system of FIGS. 9a and 9b. In this regard, it will be appreciated that any of the locking mechanisms can be associated with any of the truck body or container lifting mechanisms and that each incorporates a means to displace the truck body or container along the chassis to accomplish locking, either automatically or by separate means such as aligning openings with latch pins.

The truck body is released by simply reversing the steps used to secure the body to the chassis. As with the rotating eccentric cam systems, the other loading and unloading mechanisms for the containers or truck bodies are also provided with any necessary interlocks to prevent events from happening in an improper sequence.

FIG. 14 depicts the truck assembly associated with FIGS. 1 and 2 but including an additional container or body 18 fixed in a similar manner to a trailer chassis 260 commonly referred to as a "four wheeler" carried by wheels 262 and connected by a spaced trailer hitching frame arrangement 264. Electrical, hydraulic and/or pneumatic connections are made between the main chassis and the trailer chassis via a connector 266 in a well-known manner. The mechanism for loading and unloading the container or truck body 18a from the trailer chassis 260 may be identical to those discussed with regard to the main truck chassis. They may readily be exchanged. Once the truck body originally placed on the truck chassis 18 is full, both bodies can be removed, each from the respective carrying chassis, and the empty one then remounted on the truck chassis and the full one, or yet another empty one mounted on the trailer chassis so that the vehicle can fill at least two truck body containers prior to any need for going to a landfill.

Figure 15:
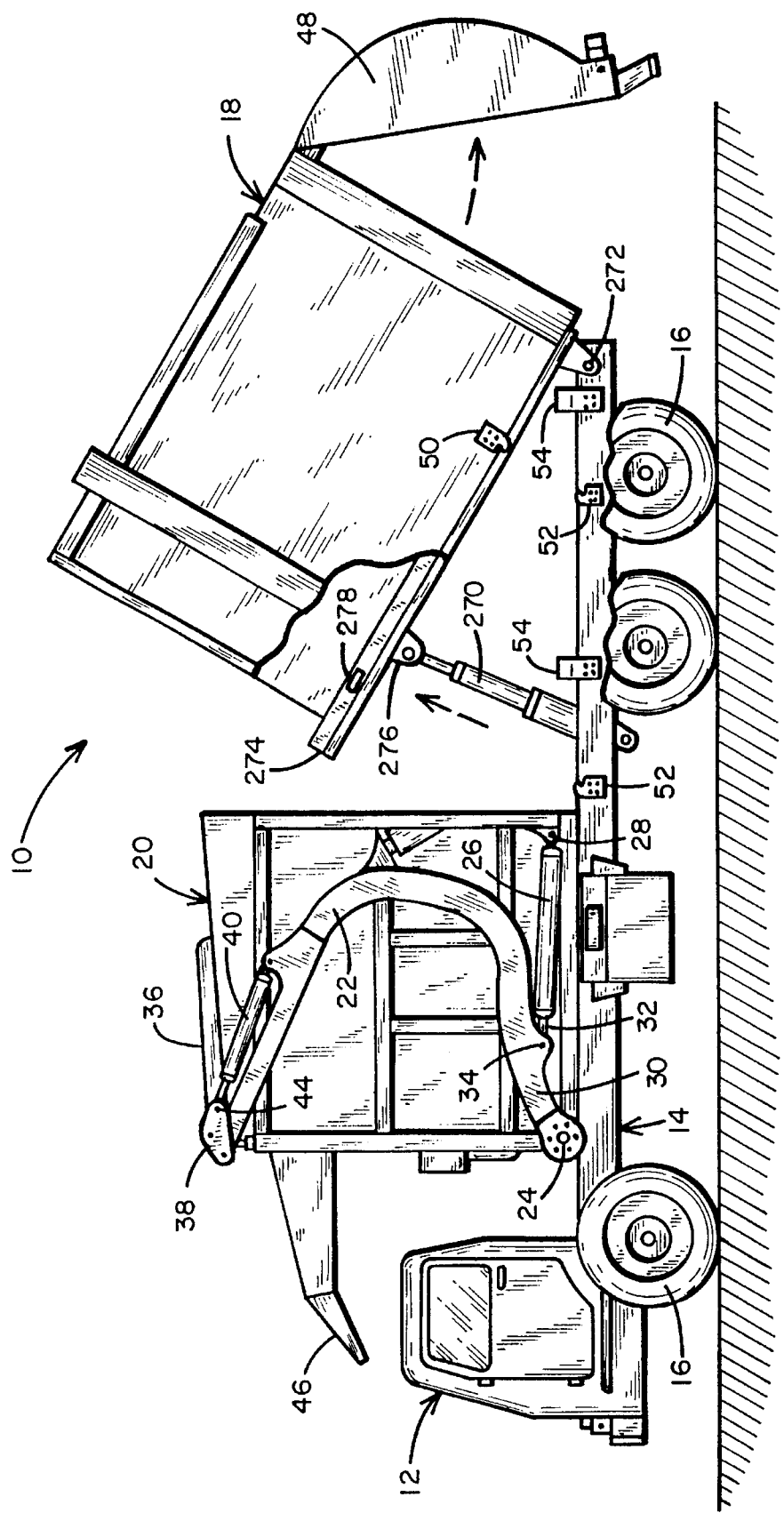
FIG. 15 presents yet another embodiment employing a tilt-up system for emptying an exchangeable truck body in accordance with the invention.

FIG. 15 depicts yet another mechanism for handling any of the embodiments using the container or truck bodies 18 which includes a telescoping pivoting or dump cylinder mechanism 270 which can be used to tilt a truck body once it has been detached from the interlocking hooks or latch pins, or other locking device, so that it may be directly emptied by pivoting up from the truck chassis. This represents an additional optional mechanism which can be used with any of the raising, lowering and latching mechanisms described. For the purposes of tilt-up, the truck body will be as provided with pivot members as at 272 which ride in grooves in the chassis and are utilized only for tilting the truck body to discharge accumulated materials. Once returned to a substantially horizontal posture, the truck body can thereafter be lifted straight up or otherwise manipulated as per the detaching mechanisms of the invention.

A particularly advantageous embodiment of the invention is illustrated by FIGS. 16–24. The embodiment involves the use of a mechanized sub-frame sandwiched between the truck chassis and the removable truck body which integrally provides all the required support, locking mounting, lifting and tilting functions associated with exchanging and emptying the truck body. A removable body designed for such a system is depicted generally in FIG. 16 with engaging hooks and optional self-supporting leg structures omitted for simplification. The body is similar to those depicted, for example, in FIGS. 1–3 but is provided with a self-opening, manually latched tailgate. The body, generally at 280, in FIG. 16, includes a main storage container 282 having a front frame 284 partially open at 286 to receive refuse from a compacting mechanism and a tailgate designed to accommodate compacting pressure that includes a tailgate frame 288 which seals against a rear container frame 290. The tailgate further includes an upper tailgate pivot 292 and a manually-operated tailgate latch depicted at 294. The dome-shaped metallic tailgate sheet is depicted at 296.

Figure 17A:
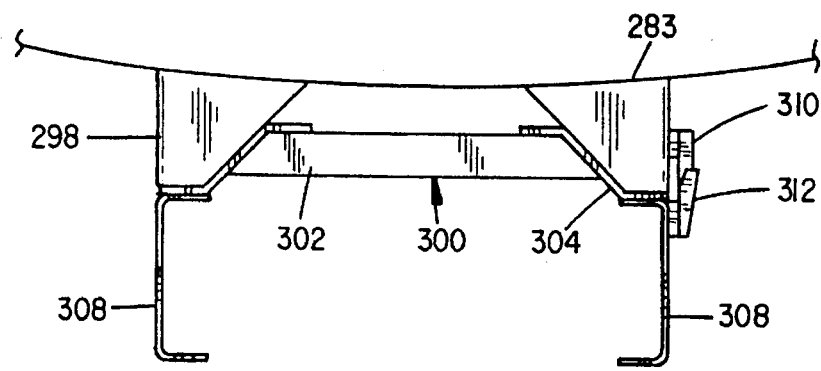
FIGS. 17a and 17b are fragmentary cross-sectional views of two embodiments of the removable body of FIG. 16 showing positioning on mechanized sub-frames and truck chassis frames.
Figure 17B:
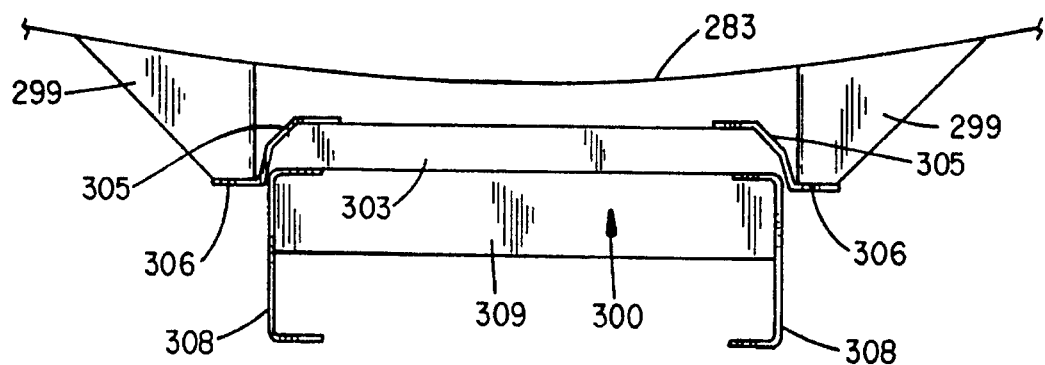

The fragmentary cross-sectional views of FIGS. 17a and 17b illustrate very generally two possible nesting arrangements of the support structure for a container body such as 280 with the sub-frame and truck chassis. The container body lower shell or floor plate 283 is supported on a pair of spaced parallel support shapes or combinations of shapes designated as base rails, 298 or 299 (FIG. 17b) which extend along, are fixed to and strengthen the container shell. The shapes 298 and 299 also act to guide the positioning of the container on the sub-frame and truck chassis as will be described.

Figure 19:
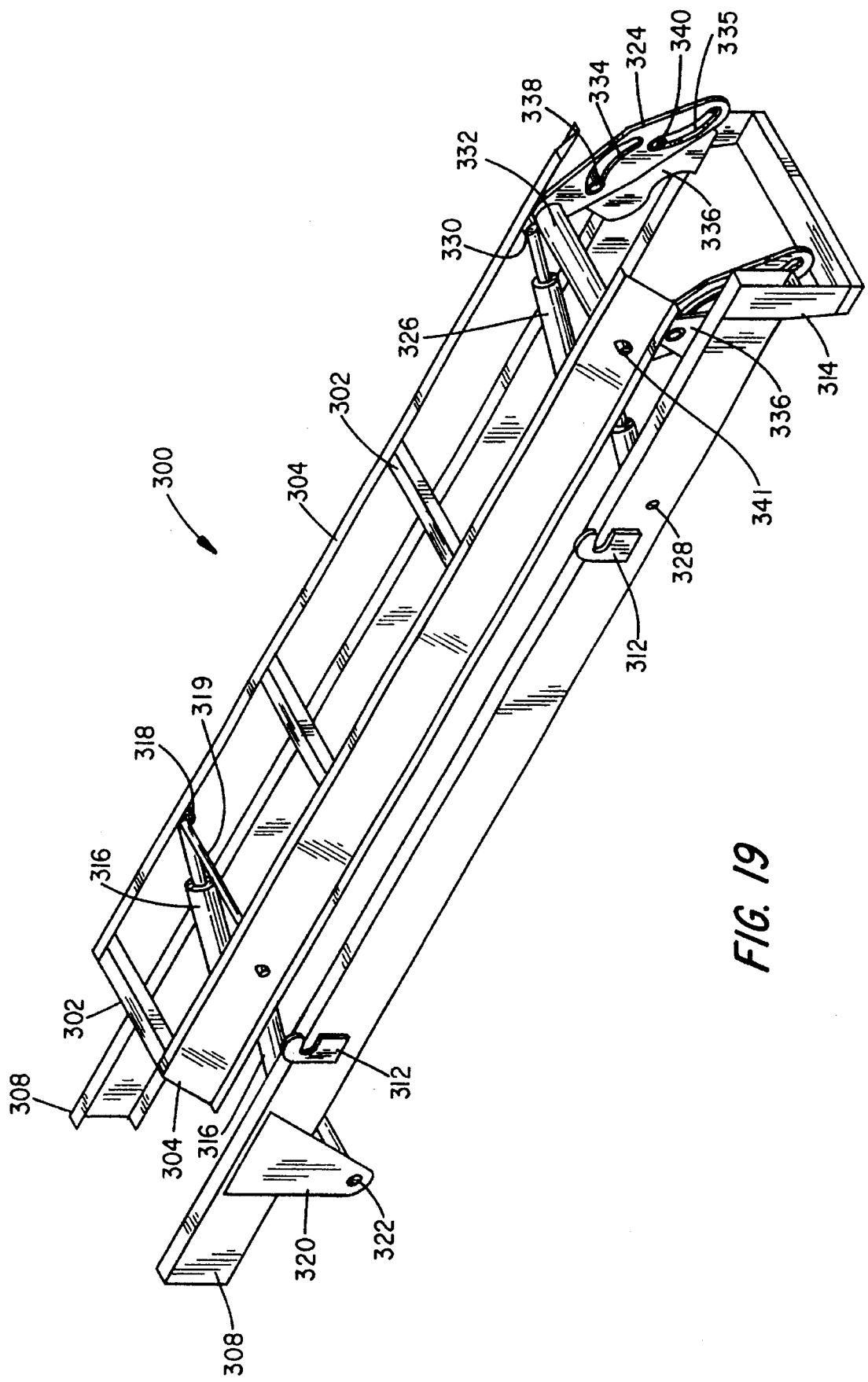
FIG. 19 is an enlarged perspective view of the mechanized chassis/sub-frame assembly of FIGS. 18a–18d.

Movable or mechanized sub-frames employed with this embodiment are depicted generally at 300 (FIG. 19). They are generally shaped as rectangular parallelograms including transverse end and intermediate structural members 302, 303 (FIG. 17b) separated by and connected to a pair of elongated spaced parallel longitudinal structural shapes or stringer members 304 or 305.

In FIG. 17a, opposed sloping interfaces are provided between the members 304 and 298 or 305 and 299 (FIG. 17b) to help locate and guide the structural supports into place during mounting. The sub-frame 300, in turn, rests on the longitudinal stringer members of the truck chassis depicted as a pair of inward facing heavy spaced parallel channel members 308 with lateral transverse struts or cross braces as at 309 (FIG. 17b). In this manner, the removable body 280 is uniformly supported by a movable sub-frame 300 which, in turn, is supported directly by the truck chassis frame 308. The shape of the body frame base rail and the sub-frame is such that when the sub-frame is raised or lowered, the body is centered and supported along its entire length by the body frame base rails.

FIG. 17b depicts a wider body version in which longitudinal structural shapes or members 305 extend beyond the width of chassis members 308 forming a pair of support ledges at 306 to accommodate a wider (larger) truck body on the same chassis. This version is also most compatible with the accommodation of wide supported containers or bodies such as "roll off" containers which can be left at job sites and later picked up.

Figure 16:
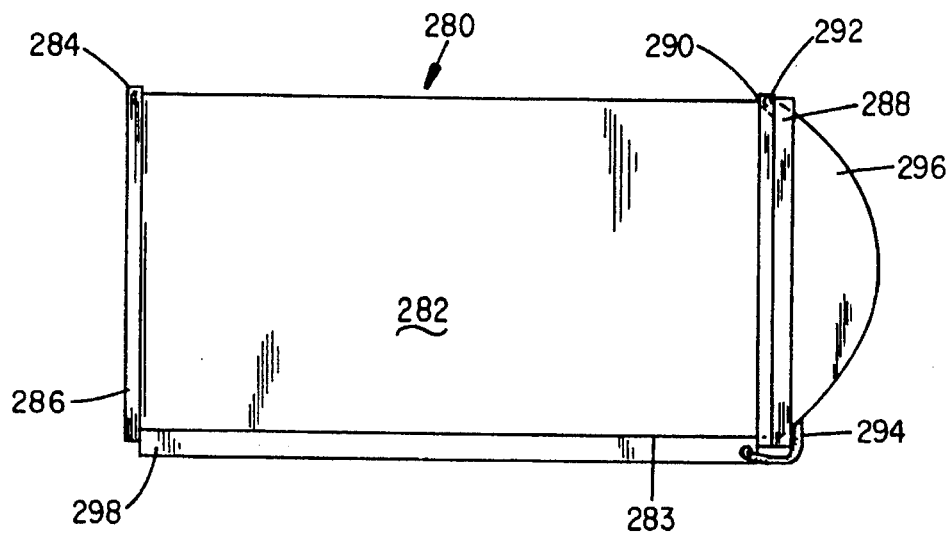
FIG. 16 is a side view of a removable body with manual self-opening tailgate with retaining means and optional self-supporting leg structure (not shown)

The exchangeable truck body depicted in FIG. 16 is one that is manually opened and latched, i.e., does not utilize or require hydraulic or other power means to open the tailgate for emptying and requires only that the latch mechanism 294 be opened manually prior to unloading the body. The tail hook mechanism is released and the body tipped up at the inlet end pivoting toward the rear end causing the material in the body to press against and open the unlatched tailgate which will eventually also open by gravity as the tip angle increases. This type of body has the advantage of reduced weight and complexity and eliminates the need for hydraulic or other mechanical connections to the body itself. The body then resembles a removable container.

Figure 18A:
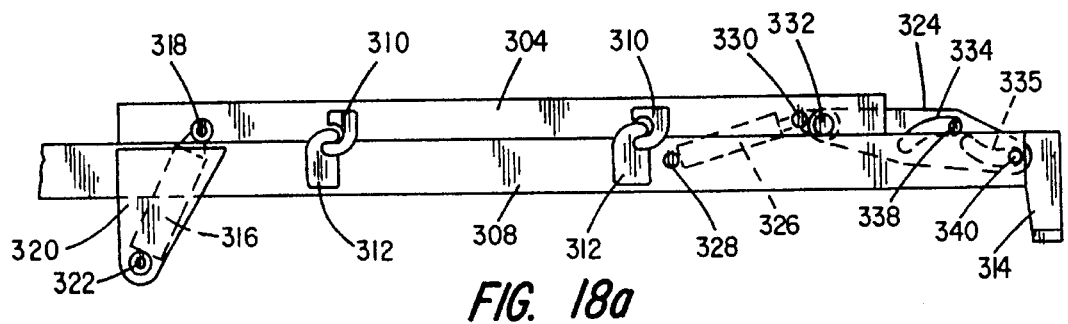
FIGS. 18a–18d depict partial side views illustrating the mechanical operation of the mechanized chassis/sub-frame assembly.
Figure 18B:
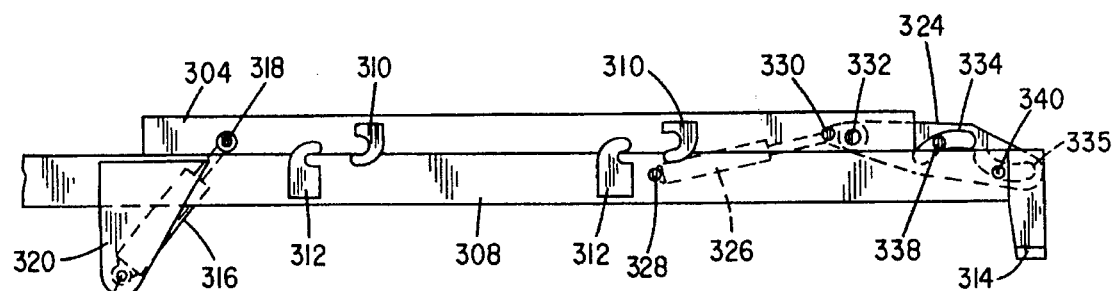
Figure 18C:
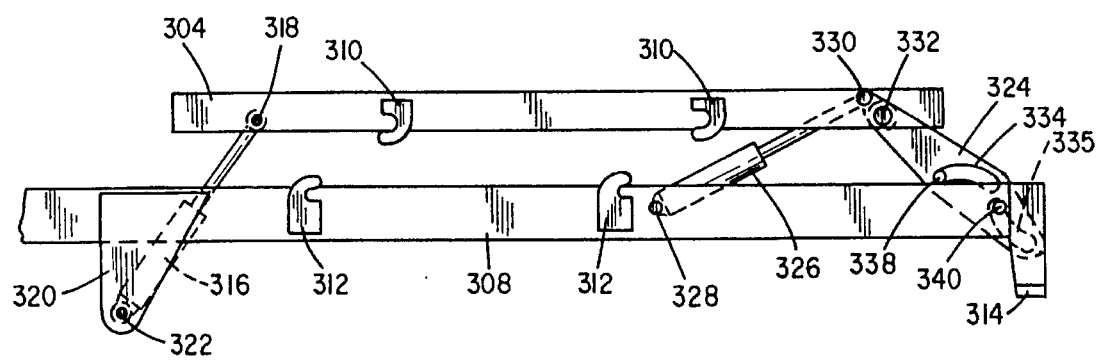

The mechanical relationship and operation of the chassis/sub-frame combination is depicted in FIGS. 18a–18d and in the perspective view of FIG. 19, which view corresponds to the position assumed in the side view of FIG. 18c using the sub-frame of FIG. 17a. FIGS. 18a–18d are partial side views illustrating the mechanical components and demonstrating positions of operation of the mechanized chassis/sub-frame assembly in accordance with one embodiment. The side and perspective views of the chassis/sub-frame assembly depicted in the Figures show how the sub-frame relates to the truck chassis frame. This is depicted without the removable body and associated hardware which need not be shown inasmuch as the truck body itself is not mechanized in this embodiment. In the initial view of 18a, the sub-frame is depicted in its full forward (left) and locked position with respect to the truck chassis. In this position, the sub-frame is in position to be engaged with the loading hopper and the frame locking hooks as described for earlier embodiments. These include upper hooks 310 which may be attached to the members 304 or to the truck body longitudinal structural supports as at 298 (FIG. 17a) meshed with lower hooks 312 attached to chassis members 308. The chassis further includes a rear truck bumper member 314.

As best seen in FIG. 19, the mechanical assembly which operates the sub-frame 300 includes a pair of spaced raising and tilting cylinders 316 pivotally connected at the rod ends to the inside of sub-frame 300 as at 318 or a common transverse rod 319. The remaining ends of the cylinders 316 are connected at the inside of structural mounting plates or gussets 320 by a common rod 322 connecting the plates. The aft portion of the sub-frame/chassis system is provided with a cam system including a pair of spaced, shaped pivoting cam members 324, a pair of slide cylinders 326 pivotally connected to the inside of spaced chassis stringers 308 at either end of a common rod 328 at one end and to the inside of one end of cam members 324 at 330. The structure is stabilized by a sturdy torque tube 332 that extends the width of the sub-frame and is secured to one end of each of the cam plates 324. The torque tube 332 acts as a sub-frame and sub-frame cylinder drive stabilizing member that prevents twisting or distortion of the sub-frame during operation. A pair of shaped cam openings 334 and 335 are provided in each cam plate. The openings consist of a relatively straight segment and a curved portion symmetrically positioned with respect to each other. Cam rollers or followers 338 and 340 mounted to the truck chassis frame guide the shaped cam openings 334 and 335, respectively, in each cam plate 324. The spaced cam plates are preferably located just inside of the truck chassis frame members 308 and sub-frame structural members 304, as indicated above, consists of two identical plates stabilized in parallel spaced orientation by the common torque tube 332. The outer ends of rollers or followers 338 and 340 are fixed to roller mounting plates 336 fastened to the inside of chassis members 308. Each end of the torque tube 332 is provided with a journal mounting in the sub-frame as at 341 so that the tube may rotate relative to the sub-frame as necessary with the operation of the system.

FIG. 18b shows the sub-frame assembly shifted partially rearward from the position shown in FIG. 18a occasioned by the partial extension of the cylinders 316 and 326. Note that the locking hooks 310 and 312 are now laterally disengaged. In this position, the removable body and sub-frame remain in a fully lowered position, shifted rearward to disengage the frame locking hooks and the front of the body from the loading hopper (see FIGS. 20, 21 and 22a and 22b). Note that the cams 324 have also been displaced such that cam rollers 338 and 340 have followed along the straight segment of cam openings 334 and 335 as the sub-frame has been moved rearward a like amount.

FIG. 18c and FIG. 19 illustrate the sub-frame assembly in its fully rearward and raised platform position. This is accomplished by continuing to partially extend the tilt cylinders 316 and fully extending the slide cylinders 326. As the slide cylinders continue to extend, the curved portions of the cam slots encounter the rollers and causing the end of the cam plate to raise up. When the slide cylinders are fully extended, the cam slots have reached the end of their motion relative to the rollers. It is in this position that auxiliary support means such as that shown in FIGS. 10 and 11 may conveniently be deployed with respect to a truck body sought to be removed from the tilt frame 300 or, conversely, folded up should the procedure be one of mounting the truck body as the weight is entirely assumed by the sub-frame. In this position, the platform or sub-frame is still substantially parallel to the truck chassis.

Figure 18D:
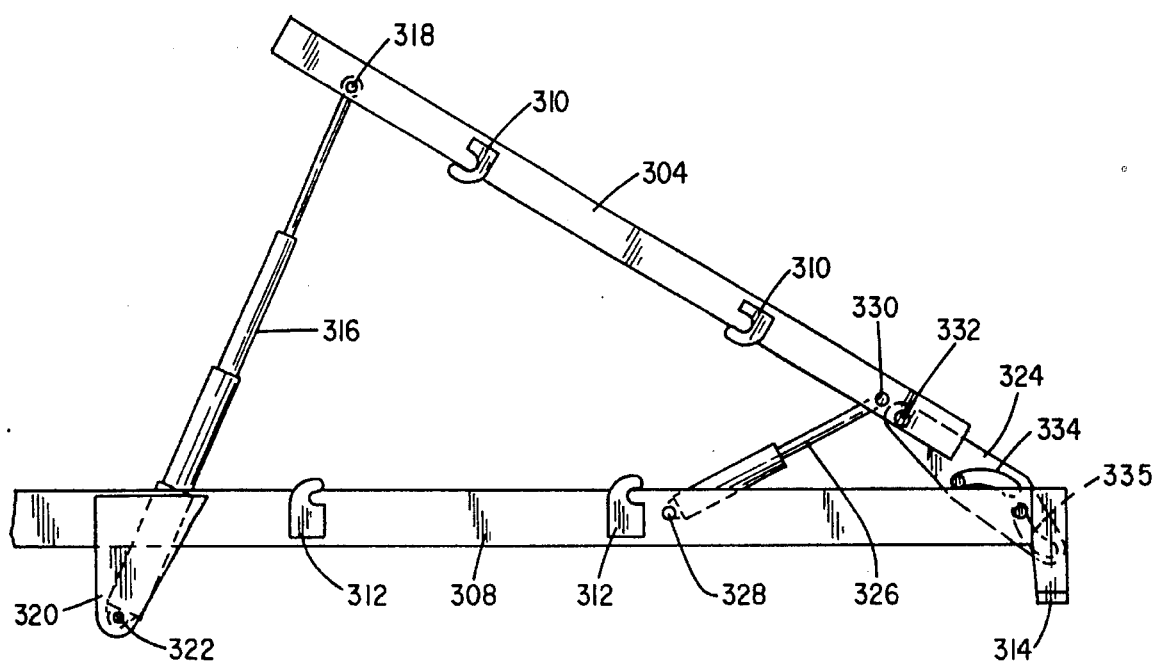

In FIG. 18d, the assembly is shown after it has been shifted fully rearward and raised and then tilted. This is accomplished by continuing to extend the telescoping tilt cylinders 316 until they are fully extended in a telescoped position. The sub-frame, once it reaches the end of the cam slots 334 and 335 in its raised position, of course, ceases its rearward travel but continues to pivot upward about journalled mountings 341 with the further extension of the cylinders 316. This position accommodates the emptying of the body of its load of material through the tailgate such as described in conjunction with FIG. 16.

The sub-frame with its cam plate mechanisms functions in a sequence in accordance with the operation of the tilt and slide cylinders 316, 326. With the progressive extension of these cylinders, the system moves in a sequential manner as shown in the FIGS. 18a–18d with the body exchange taking place as by the setting in place of the leg structure so that the body can be left freestanding occurring in the position of FIG. 18c (to which the system can be returned after unloading at 18d).

In conjunction with the operation of the lifting and compacting system and with the tilting of the body in accordance with FIG. 18d for discharge, a positive latching mechanism is also provided to assure the integrity of the connection between the truck body and the sub-frame 300. For this function, any of the latching mechanisms illustrated in FIGS. 4a–4c, 5a, 5b, 6a–6c, 8 and 9a and 9b can be employed and implementation to the sub-frame would readily follow. The single-cylinder operated system of FIGS. 9a and 9b is especially useful for this embodiment although it is not shown specifically with respect to the connection of the body of FIG. 16.

The positions assumed by a replaceable body or container of the class employed in conjunction with the mechanized sub-frame are further depicted with respect to a front loading refuse vehicle, generally at 340, in FIGS. 20–24. This vehicle, of course, may be of similar design as that depicted in FIGS. 1 and 2 and includes a loading/compacting hopper section 342 which further includes an hydraulic compacting system permanently mounted on the vehicle chassis which forces refuse deposited in the receiving hopper 342 back into the modular truck body 280 through a connecting or transition chute 344 (FIG. 21) and opening 286 in body 280. As with the earlier-described embodiment, the vehicle includes a pair of lifting arms, one of which is shown at 345, pivotally mounted at 346 and raised and lowered by a pair of hydraulic cylinders, one of which is depicted at 346. Pivotal fork arms 348 which are movable with respect to the lifting arms 345 and operable by cylinders as at 350 aid in grasping boxes to be lifted and distributed into the loading/compacting hopper 342. The operation is well known and has also been described in regard to FIGS. 1 and 2 above.

Figure 20:
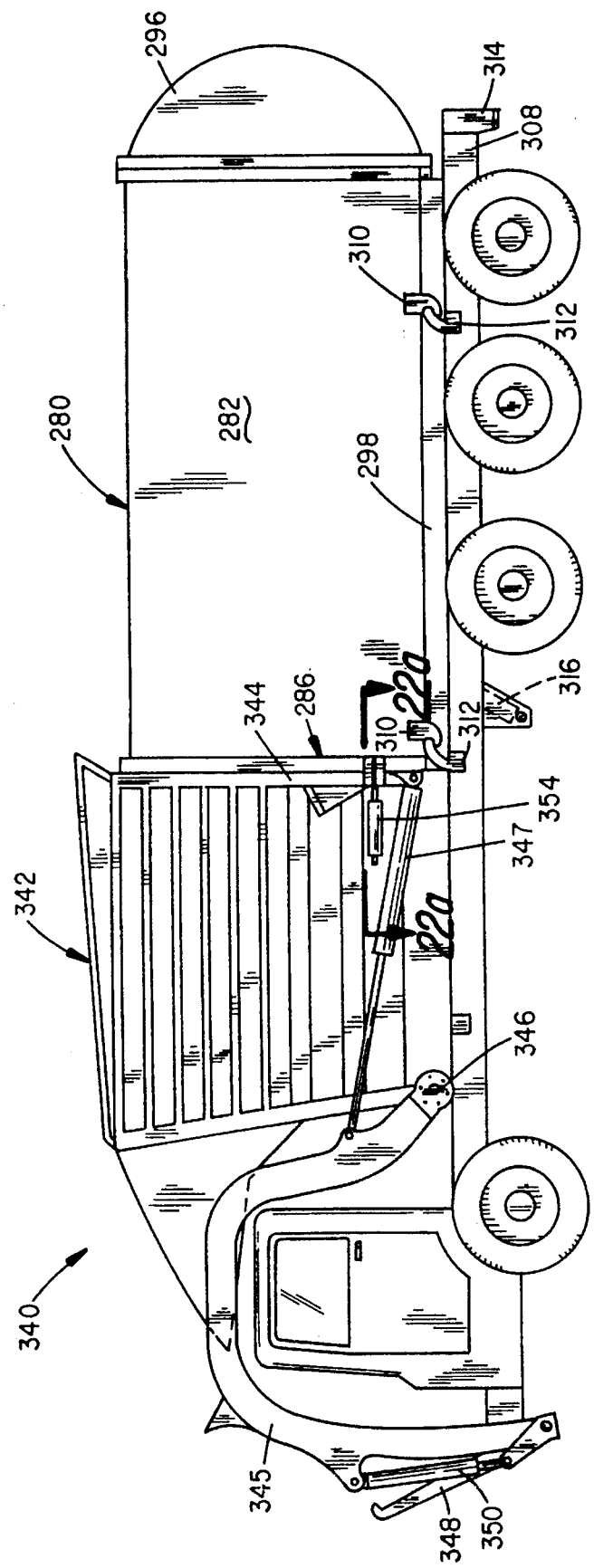
FIG. 20 is a side view of a front loading refuse hauling vehicle carrying the removable body of FIG. 16 including the mechanized sub-frame in the forward, locked position.
Figure 21:
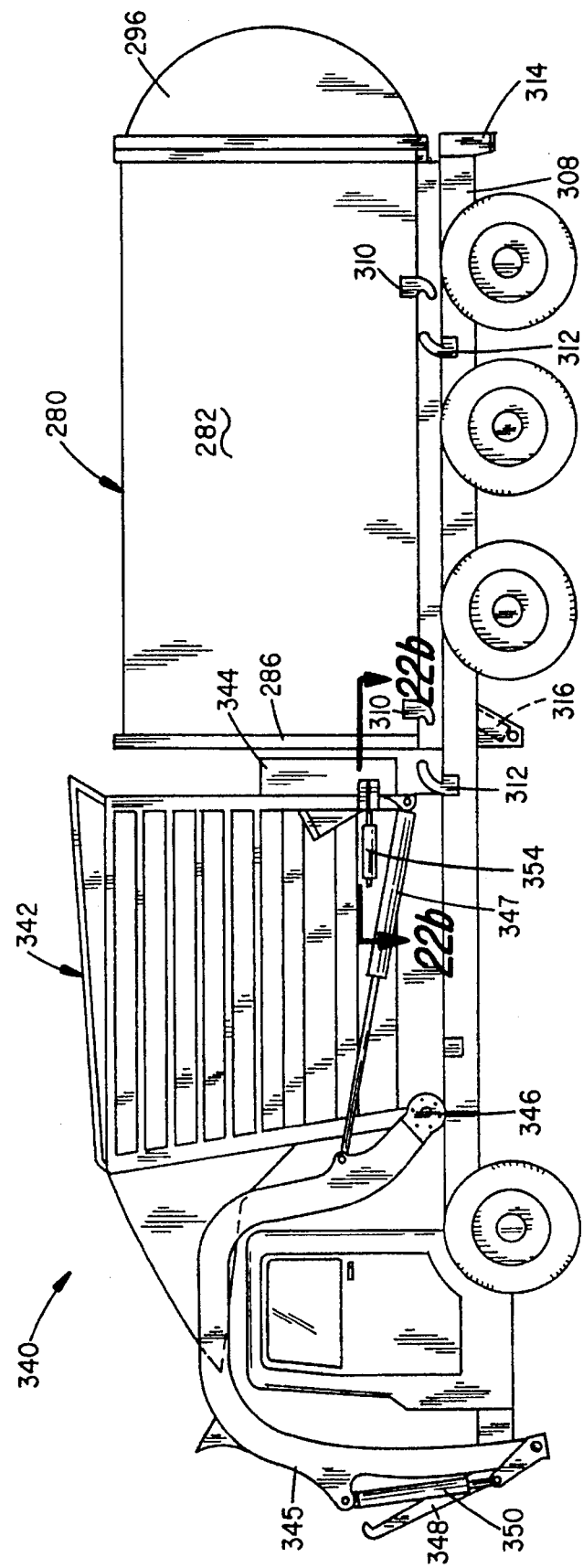
FIG. 21 illustrates the refuse vehicle of FIG. 20 with the removable body shifted rearward to an unlocked position.
Figure 23:
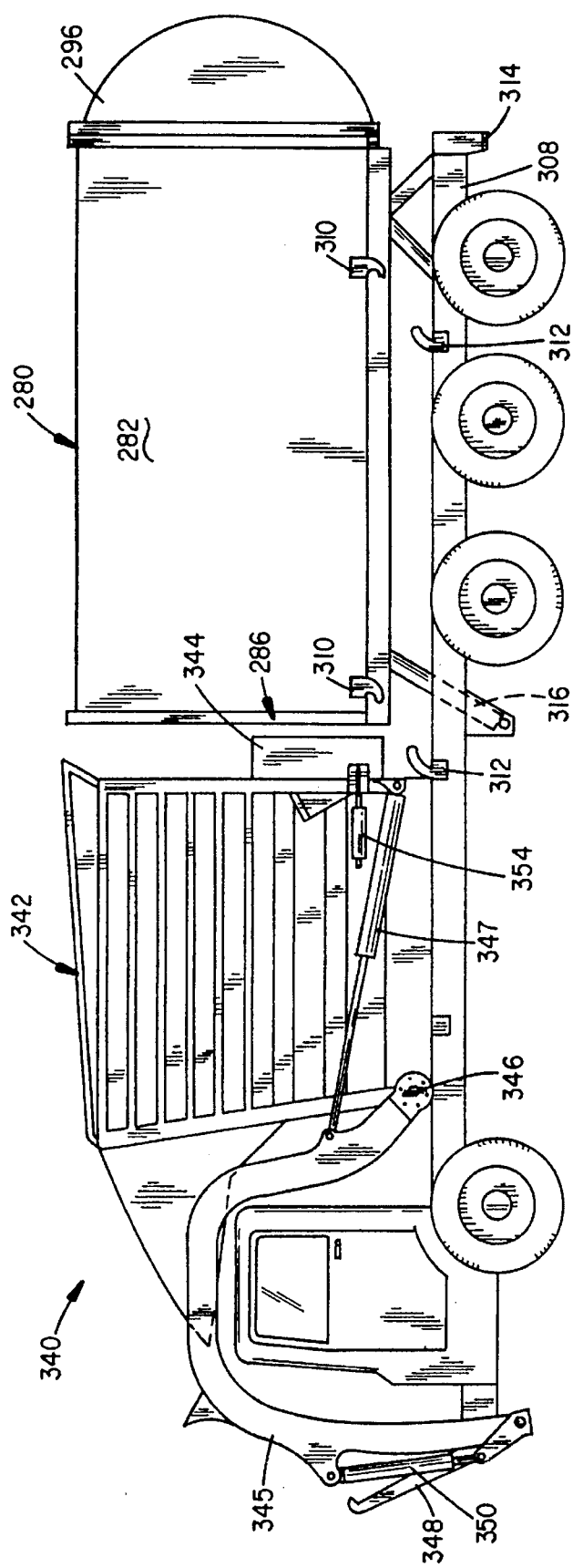
FIG. 23 illustrates the refuse hauling vehicle of FIG. 20 with the removable body rearward and the auxiliary frame raised.
Figure 24:
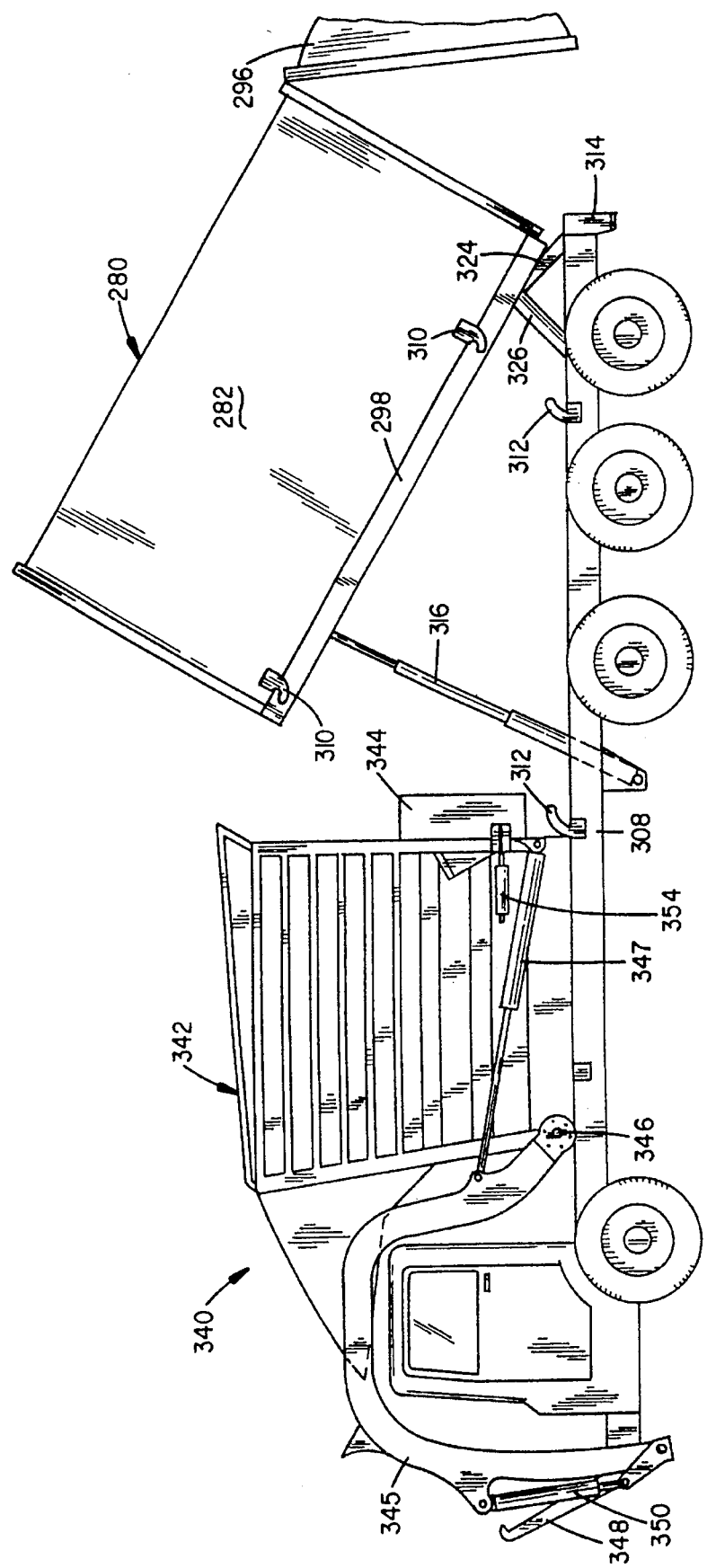
FIG. 24 illustrates the refuse hauling vehicle of FIG. 20 with the removable body deployed rearward and the auxiliary frame raised and tipped for unloading.

In FIG. 20, the truck body 280 is shown in the lowered, fully forward and locked position for refuse collection. In FIG. 21, the truck body 280 is depicted as shifted aft as in FIG. 18b and the refuse transition chute 344 which addresses the opening 286 in the body 280 is shown exposed clear of the body 280 and the body hooks 310 and chassis hooks 312 disengaged laterally. FIG. 23 depicts the body 280 in the rear-shifted, raised but level position and FIG. 24 shows the body 280 in the tipped, discharge position.

Figure 22A:
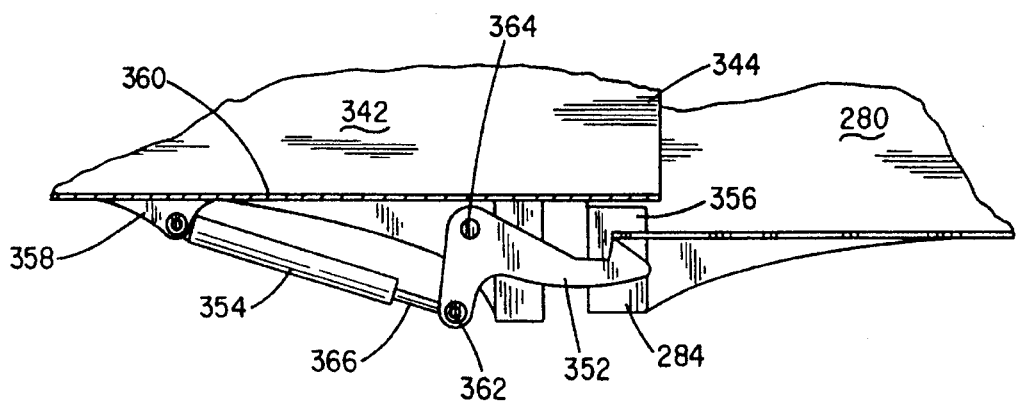
FIGS. 22a and 22b are enlarged fragmentary top detail views depicting a mechanism for latching the removable body to the loading hopper.
Figure 22B:
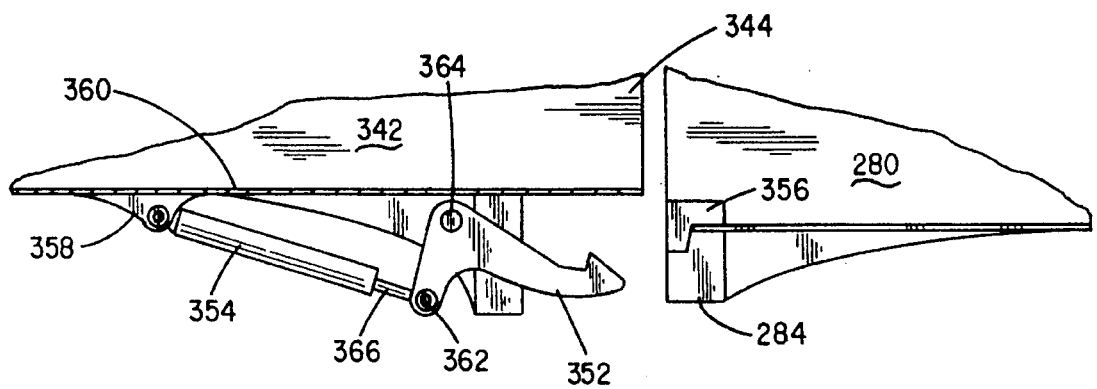

The truck body 280 also needs to be securely attached to the receiving/compacting hopper area of the truck 340 in order to assure that compacted waste material properly enters the exchangeable truck body and that the large forces associated with the operations of packing mechanisms do not dislodge the truck body from its mooring. This is true with any of the embodiments depicted in the specification. FIGS. 22a and 22b are enlarged fragmentary top detail views depicting one mechanism for latching the removable body to the loading/compacting hopper 342. FIG. 22a depicts the side body latch mechanism in the fully latched position and FIG. 22b depicts the same system as disengaged and separated. FIG. 22a shows an aft fragment of the chute 344 as it protrudes beyond the front frame (shown at 284) into the truck body 280. The mechanism includes a large pivotal hook 352 operated by cylinder 354 to engage a latch 356. The cylinder 354 is pivotally mounted between a heavy gusset 358 fastened to a plate member 360 and a pivot joint 362 which operates the hook 352 about a pivotal mount 364. As shown in FIGS. 22a and 22b, retraction of the rod 366 of cylinder 354 rotates the hook clockwise to disengage it from the latch 356. Conversely, extension of the rod 366 by expanding the cylinder 354 engages the hook 352 with the latch 356. In this manner, the latch system provides a positive mechanical link between the pivot mount 364 on the loading and compaction hopper 342 and the latch 356 on the body 280. Note that the chute 344 is vertically clear of the movable body 280 in FIG. 22*b*.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

For example, the truck bodies may be received on a platform which may be addressed with the body in the unlatched, raised position. Other types of leg supports may be employed in the self-supporting embodiment. Also, the parts of the securing mechanism may be located anywhere on the chassis/container compatible with a particular design. The number, location and drive means for operating the eccentric cam or cams, for example, may vary. Thus, the cam system may be mounted decidedly forward of the illustrated location; cams may be chain, screw or gear driven. Other variations will occur to those skilled in the art.

I claim:

1. A mechanized, self-contained vehicle mounted handling system for facilitating the exchange of detachable modular containers to be carried by a vehicle chassis, including integral means for latching/locking and receiving/separating said container, said system comprising:

(a) vehicle chassis for supporting a modular container;

(b) container mounting sub-frame having a front and a rear portion carried on said chassis;

(c) sub-frame operating means connected between said sub-frame and said chassis for manipulating said sub-frame relative to said chassis wherein said sub-frame operating means further comprises means for laterally displacing said sub-frame fore and aft realtive to said chassis, means for raising and lowering said sub-frame relative to said chassis and means for raising the front portion of said sub-frame upward to tilt said sub-frame relative to said chassis and wherein motion of the rear portion of said sub-frame relative to said chassis is governed by a cam and roller system.

2. The handling system of claim 1 wherein said sub-frame operating means further comprises a plurality of fluid operated cylinders connected between said sub-frame and said chassis.

3. The handling system of claim 2 further comprising means for locking said modular container to said chassis.

4. The handling system of claim 2 further comprising locking means for locking said sub-frame to said chassis.

5. The handling system of claim 1 wherein said vehicle is a front or side loading refuse truck having a forward loading/compacting hopper section and further comprising means for locking said container to said loading/compacting hopper section.

6. The handling system of claim 5 wherein said means for locking said container to said loading/compacting hopper section comprises cylinder operated side body hooks.

7. The apparatus of claim 1 wherein said sub-frame comprises a pair of spaced parallel elongated longitudinal structural members connected by transverse members which provide continuous rectangular support to a container or truck body of like shape nested thereon, said longitudinal members further having cross sectional shapes that slope outward to provide positive centering of a container designed to be received by being lowered and nested thereon.

8. The apparatus of claim 1 further comprising means for locking said modular container to said chassis.

9. A mechanized, self-contained vehicle-mounted system for facilitating the exchange of detachable modular containers to be carried by a vehicle chassis, including integral means for latching/locking/receiving/separating said container, said system comprising:

(a) vehicle chassis for supporting a modular container;

(b) container mounting sub-frame carried on said chassis;

(c) sub-frame operating means connected between said sub-frame and said chassis for manipulating said sub-frame relative to said chassis comprising a plurality of fluid operated cylinders connected between said sub-frame and said chassis and spaced cam plates operated by said fluid cylinders and connected between a common torque tube on said sub-frame and cam rollers attached to said chassis, said cam rollers extending through shaped cam openings in said cam plates to guide the lateral and vertical motion of said rear portion of said sub-frame.

10. A mechanized, self-contained vehicle-mounted system for facilitating the exchange of detachable modular containers to be carried by a vehicle chassis, including integral means for latching and locking and receiving and separating said container, said system comprising:

(a) vehicle chassis for supporting a modular container;

(b) container mounting sub-frame carried on said chassis;

(c) sub-frame operating means connected between said sub-frame and said chassis for manipulating said sub-frame relative to said chassis;

(d) wherein said receiving/separating means further comprises deployable latch/locking means on said sub-frame for latching and locking said container to said sub-frame; and (e) latch locking means for locking the latch means in the latched position, said latch locking means further comprising an over-center linkage arrangement.

11. A mechanized, self-contained vehicle-mounted system for facilitating the exchange of detachable modular containers to be carried by a vehicle chassis, including integral means for latching and locking and receiving and separating said container, said system comprising:

(a) vehicle chassis for supporting a modular container;

(b) container mounting sub-frame carried on said chassis;

(c) sub-frame operating means connected between said sub-frame and said chassis for manipulating said sub-frame relative to said chassis;

(d) wherein said receiving/separating means further comprises deployable latch/locking means on said sub-frame for latching and locking said container to said sub-frame; and (e) wherein the latching and locking means further comprises mechanized extendable and retractable latch pin means, over-center locking linkage associated with the extension of said latch pin members and positive stop means associated with the retraction of said latch pin members.

* * * * *